US005990635A

United States Patent [19]

Ference et al.

[11] Patent Number: 5,990,635

[45] Date of Patent: Nov. 23, 1999

[54] MULTI-ZONE LIGHTING CONTROL SYSTEM

[75] Inventors: Jonathan H. Ference, Riegelsville; Donald F. Hausman, Emmaus; John F. Loar, Allentown; Robert S. Spehalski, Emmaus; Walter S. Zaharchuk, Allentown, all of Pa.

[73] Assignee: Lutron Electronics Co., Inc., Coopersburg, Pa.

[21] Appl. No.: 09/102,296

[22] Filed: Jun. 22, 1998

Related U.S. Application Data

[62] Division of application No. 08/226,194, Apr. 11, 1994, Pat. No. 5,530,322.

[51] Int. Cl.[6] .................................................. H02B 37/02

[52] U.S. Cl. ......................... 315/362; 315/295; 315/324; 315/DIG. 4; 315/119

[58] Field of Search .............................. 315/DIG. 4, 119, 315/287, 362, 295, 294, DIG. 5, 293, 316, 324, 291

[56] References Cited

U.S. PATENT DOCUMENTS

| | | | |
|---|---|---|---|
| 4,473,779 | 9/1984 | Lindner et al. | 315/119 |
| 4,651,060 | 3/1987 | Clark | 315/DIG. 4 |
| 5,729,097 | 3/1998 | Holzer | 315/DIG. 4 |

*Primary Examiner*—Don Wong
*Assistant Examiner*—Wilson Lee
*Attorney, Agent, or Firm*—Seidel, Gonda, Lavorgna & Monaco, PC

[57] ABSTRACT

A lighting dimmer for controlling the current through a lighting load includes circuitry for applying a predetermined dimming level control signal to a control circuit in response to the absence of a dimming level control signal and the cycling OFF and ON of a circuit breaker. The dimmer further includes voltage compensation circuitry for maintaining a constant lighting load current notwithstanding short-lived changes in nominal line voltage.

5 Claims, 19 Drawing Sheets

MULTI-ZONE LIGHTING CONTROL SYSTEM

This is a divisional of application Ser. No. 08/266,194 filed on Apr. 11, 1994 now U.S. Pat. No. 5,530,322.

BACKGROUND OF THE INVENTION

1. Field of the Invention

The present invention relates to improvements in relatively sophisticated lighting control systems of the type used most often in commercial settings for controlling the luminous output of a large number of lighting fixtures which are grouped together in some manner to define various "zones" of light.

2. Description of Related Prior Art

In many commercial lighting applications where large numbers of lighting fixtures (say, for example, several hundred) are used to illuminate areas of interest, it is common to group the fixtures in such a manner as to define "zones" of light which can be independently controlled from one or more wall-mounted control units. The wallmounted control units are typically located in the vicinity of the lights they control. Each control unit usually comprises an array of manually manipulatable zone-intensity or "dimming" actuators, such as sliders or up/down push-buttons, each actuator being specifically assigned or dedicated to a particular lighting zone. Manipulation of any one of these actuators serves to vary a characteristic of a lighting control signal transmitted by the control unit and used to control the output of one (or more) dimming circuits or modules, hereinafter referred to as "dimmers," which apply power to each of the lighting fixtures defining a particular lighting zone. In addition to providing a means for adjusting the instantaneous light level of several zones of light, each control unit is usually adapted to store preset values for each of the lighting zones controlled by its respective actuators. In response to the actuation of any one of several "scene-select" switches on the control unit, stored preset values can be simultaneously recalled for all of the lighting zones, thereby creating any one of several different lighting scenes in the area illuminated by the preset lighting zones. Such multizone, multi-scene lighting control units are commercially available, for example, from Lutron Electronics Co. Inc. under the registered trademark "Grafik Eye".

As noted above, it is common to locate the lighting control units in the vicinity of the lighting fixtures they control. The dimmers through which they control power to the fixtures, however, are usually mounted in a centrally located power cabinet which is remote from the control units and lighting fixtures. Communication between the control units and the power cabinet has been achieved by a digital communications link in which the control units sequentially transmit, in a multiplex fashion, zone-intensity information on a low voltage communications bus. The multiplexed information is decoded in the power cabinet by a microprocessor forming part of a dimmer control panel circuit which controls the operation of the dimmers. Upon decoding the multiplexed zone-intensity information and determining, for example, through an appropriately programmed look-up table, which of the dimmers is to receive and act on certain zone-intensity information received by the microprocessor, the dimmer control panel circuit transmits such information to the appropriate dimmers. While it is known to transmit this data to the dimmers on wires connecting each dimmer to the dimmer control panel circuit, it is also known to multiplex such transmission on a digital communications link. In the latter case, each dimmer is assigned a unique binary (or digital) address code, and it responds only to zone-intensity information on the link that is preceded by (or somehow associated with) its respective address code. A microprocessor associated with each dimmer processes the address and zone-intensity information and outputs a dimming control signal which is used to control the firing angle of a triac or the like, thereby adjusting the RMS voltage applied to the associated lighting load and, hence, its luminous output.

In the past, "digital" dimmers of the above type have employed either an array of bi-stable "DIP" switches or one or more multipositional rotary selector switches to define the unique address code of each circuit. See, for example, the digital dimmers made by Lite-Touch Inc. In the case of the bi-stable DIP switches, for example, the binary address code of each dimmer is set during system installation by moving a small switch actuator on each switch of the array to one of its two stable positions. It will be appreciated that, in the event that one or more of the dimmers needs replacement, the system user is required to manually set the state (or position) of the address switches of the replacement dimmer to assure that the replacement dimmer responds only to the zone-intensity information intended for the dimmer that has been replaced. Should this detail be overlooked or not understood, a service call may be required to correct the situation.

In addition to the digital addressing problem noted above, multizone lighting systems of the above type are notoriously difficult to modify (e.g., add dimmers or change the assignment of zone-intensity actuators) once the system is installed and operating. It will be appreciated that, during set-up and check-out, written documentation is always available to correlate each dimmer with the zone-intensity actuator that controls its output. Such documentation is usually in the form of a listing that assigns each dimmer to a particular zone actuator. This listing is desirable when it comes time to program the dimmer control panel circuit's look-up table that correlates the individual zone-intensity actuators with the dimmers. Should this documentation be unavailable or not readily understood at the time when modifications or additions to the system are required, a great deal of time can be expended in determining what actuator controls what circuit, and what symbology was used to identify the zone actuators so that reprogramming of the look-up table can be carried out. Say, for example, a lighting system comprises three wallbox control units, U1, U2 and U3, disposed at different locations within a lighting region, and each control unit is capable of controlling six lighting zones through the manipulation of six zone-intensity actuators A1 through A6. Further assume that the system comprises 24 dimmers which control power to the various lighting fixtures of the system. In programming the dimmer control panel circuit's look-up table, it is necessary to assign each zone-intensity actuator to one or more dimmers. To conserve memory space, this programming is effected by using some abbreviated symbology, such as "U2,A3" and "D19" to identify a particular zone-intensity actuator and its assigned dimmer circuit, respectively. Should one desire to add a new dimmer to the system, one must not only possess the apparatus required to effect re-programming, but also one must have the knowledge of the symbology used in programming the power panel. Even having this information, the system user would then have to know how to program the power panel, a daunting task for all but a few. Ideally, the user should be able to add a new dimmer without need for consultation and/or assistance from the system installer.

A further problem associated with multi-zone lighting control systems of the above type is that of providing an efficient and low-cost means for dissipating the substantial levels of thermal energy generated by each of the dimming circuits so that a large number of such circuits (e.g., 24) can be housed in a relatively compact space. As noted above, each dimming circuit includes a power switching device, e.g., a triac, which serves to interrupt the line voltage applied to a lighting load for a preselected period during each half-cycle to control the RMS voltage across the load. It also includes a relatively large choke or coil which forms part of a radio frequency interference (RFI) suppression and lamp de-buzzing network. When the dimmer is operating, both of these components heat to temperatures well in excess of 100 degrees Centigrade and act to irradiate the other components of the dimmer module. To assure proper performance of the dimmer, it is common to thermally couple the power-switching device and RFI choke to a relatively elaborate heat sink, e.g. an aluminum plate with heat-dissipating fins. Further, it is common practice to either select the other dimmer circuit elements for their ability to withstand and operate under high temperature conditions, or to provide sufficient spacing between the heat-generating components and other components. As may be appreciated, these temperature-compensating measures tend to add significant cost to the lighting control system, and/or enlarge the physical size of the dimming panel, i.e., the structure that supports multiple dimming circuits.

Additional drawbacks of existing digital dimmers of the above type are: 1) the dimming circuits are not easily by-passed to provide emergency or temporary lighting in the event of a loss of the dimming control signal; in such event, jumper cables are usually used to by-pass or shunt the dimmer and thereby connect the lighting load directly to the line voltage; 2) their voltage compensation circuitry is tailored for different nominal line voltages (e.g., 110 or 277 volts), thereby requiring different dimmer circuits for different localities; and 3) they can be difficult to trouble-shoot in the event of system or component failure.

SUMMARY OF THE INVENTION

In view of the foregoing discussion, one object of this invention is to provide a multizone lighting control system of the above type in which there is no need for written documentation in assigning a zone-intensity actuator to a selected dimmer.

Another object of this invention is to provide a digital dimmer that requires no conscious operator involvement in setting its unique binary address code.

Another object of this invention is to provide an improved dimming circuit panel which, owing to the arrangement of the heat-generating components of a plurality of dimming circuits on a specially contoured metal support plate, is especially efficient in dissipating heat, thereby allowing the use of components with relatively low temperature ratings, and/or allowing more dimming circuits to be housed in given area.

Another object of this invention is to provide a simple means for providing temporary lighting at a preset level in the event of a loss or absence of a dimming control signal normally used to control the output of a dimmer to a lighting load.

Still another object of this invention is to provide a voltage compensation circuit for stabilizing the lighting system performance notwithstanding voltage variations of a transient nature, such circuit being independent of the nominal line voltage.

A further object of this invention is to provide a low-cost apparatus for detecting control unit or dimmer failure in lighting systems of the above type and for providing a visual indication of such failure to the system user.

According to one aspect of the invention there is provided an improved multi-zone lighting control system for selectively controlling the respective light levels of a plurality of lighting zones, each of such zones comprising a dimmable light source. According to a preferred embodiment, such lighting control system comprises:

(a) a lighting control unit for multiplexing zone-intensity information on a communications link, such zone-intensity information representing desired light levels for each of the plurality of lighting zones, such lighting control unit including a plurality of manipulatable dimming actuators, each being adapted to adjust the zone-intensity information to reflect a desired change in light level for a different one of the lighting zones; and (b) dimming control means operatively connected to the lighting control unit and responsive to the multiplexed zone-intensity information on the communications link for adjusting the light level of the dimmable light sources to achieve the desired light level in each of the lighting zones. Preferably, the dimming control means includes:

(i) a plurality of dimmers, each being adapted to control the luminous output of a light source in one of the lighting zones in response to receiving a dimming control signal; and (ii) means for assigning each of the dimmers to a particular dimming actuator so that the respective input signal received by an assigned dimmer is determined by the zone-intensity information adjusted by such particular dimming actuator, such assigning means comprising: (1) means for selecting a particular dimmer, and (2) means responsive to a predetermined sequence of changes of zone-intensity information on the communications link as produced by a predetermined manipulation of any one of the dimming actuators to assign such one dimming actuator to the selected dimmer.

According to a second aspect of this invention, there is provided a self-addressing dimmer that is adapted for use in a digital lighting control system of the type comprising a central control unit which communicates with a plurality of such dimmers over a common communications link to control the power applied to a plurality of lighting loads. Each of the dimmers comprises (i) a housing (e.g. a circuit board) adapted to be mounted in a predetermined location on a support plate, and (ii) means for storing a unique binary address code by which the central control unit can communicate exclusively with any one of the dimmers over the common communications link. Preferably, the address code-storing means comprises a plurality of electrical switches mounted on the associated housing of each dimmer, each of such switches having means for controlling the conductive state (open or closed) of its associated contacts. According to this aspect of the invention, the state-controlling means of each switch is controllable by switch-controlling means disposed on the support plate. Thus, as the dimmer is mounted on the support plate in its proper position, the switch-controlling means on the support plate cooperates with the state-controlling means on the dimmer housing to selectively and automatically set the respective conductive states of the switches, thereby setting the address of the dimmer. Preferably, the state-controlling means of each switch is in the form of a push button or plunger-type switch actuator which is spring-biased toward an outwardly extending position, and the switch-controlling means on the support plate comprises an array of holes and lands in the support plate. When a dimmer is properly mounted on the support plate, the lands interact with selected switch actuators, causing them to move from their respective biased positions to their non-biased positions. Meanwhile, the holes allow the remaining switch actuators to remain in their respective biased positions. When a single support plate is used to support multiple dimmers, the support plate is provided with multiple unique hole and land patterns opposite each location that is intended to support a dimmer. Thus, the address of each dimmer is determined by its position on the support plate.

According to a third aspect of this invention, there is provided an improved dimming panel which includes a thermally conductive support plate and a plurality of dimming circuits each having a heat-producing power switching device and a choke. According to a preferred embodiment, the support plate has a corrugated cross-section, and the respective chokes of the dimming circuits are mounted in close proximity to each other on the support plate at a location remote from their associated dimming circuits. This has the effect of substantially lowering the ambient temperature in the vicinity of the other circuit components, thereby prolonging their respective lifetimes.

According to a fourth aspect of this invention, there is provided a temporary lighting feature by which a preset lighting level can be provided in the event there is a loss or absence of the control signal used to control the output of the digital light dimmers. According to this aspect of the invention, means are provided for (a) sensing the absence of the control signal; (b) switching power OFF and ON to the dimmer: and (c) detecting the occurrence of both (a) and (b) and, in response thereto, applying a predetermined dimming level control signal to a control circuit adapted to control, e.g., through a triac, the current flow through a lighting load to selectively adjust the luminous output thereof.

According to a fifth aspect of this invention, there is provided an improved voltage compensation apparatus which is adapted for use in a light dimmer for maintaining a substantially constant load current (notwithstanding short-lived changes) in the line voltage. The apparatus is useful with any conventional A.C. line voltage source (e.g. 100, 120, 220 or 277 volts, 50 or 60 hertz) and preferably comprises:

(a) means operatively connected to the A.C. voltage source for determining a first time interval representing the average time required for the A.C. waveform to reach a predetermined threshold level during each half cycle of a nominal operating period;

(b) means operatively connected to the A.C. power source for determining during each half cycle of the waveform a second time interval representing the time required for the A.C. waveform to reach such predetermined threshold level;

(c) means for comparing the first and second time intervals during each cycle of the waveform and for producing an error signal representing the difference in such time intervals; and (d) means for adjusting the firing angle of a triac or the like used to control the power applied to the lighting load according to the value of the error signal to maintain the RMS voltage across the lighting load at a substantially constant level notwithstanding short-lived variations in the amplitude of the A.C. waveform of the voltage source.

According to a sixth aspect of this invention, there is provided a diagnostic apparatus adapted for use in a light dimmer of the type which selectively controls the current flow through a lighting load to adjust the luminous output thereof, such light dimmer comprising (i) a controllably conductive device (e.g. a triac) connectable in series between an A.C. power source and a lighting load, and (ii) a control circuit which responds to a dimming level control signal provided by a lighting control unit to selectively apply a selected portion of an A.C. voltage waveform produced by the A.C. power source to the lighting load to adjust the RMS voltage across the lighting load, such selected portion being determined by a phase angle at which the control circuit causes the controllably conductive device to conduct power during each half cycle of the A.C. waveform. According to this aspect of the invention, the diagnostic apparatus comprises:

(a) means for sensing the operating status of a component of the dimmer and/or the presence of the dimming level control signal;

(b) logic and control means for comparing an output of the sensing means indicating the present operating status of the component and/or the presence of the dimming level control signal with a stored value; and (c) a status indicator, preferably a single light-emitting diode, which responds to an output of the logic and control means to provide a visual indication of a change in status of the component and/or the presence of the control signal.

The invention and its various aspects will be better understood from the ensuing detailed description of preferred embodiments, reference being made to the accompanying drawings.

DETAILED DESCRIPTION OF PREFERRED EMBODIMENTS

Figure 1:
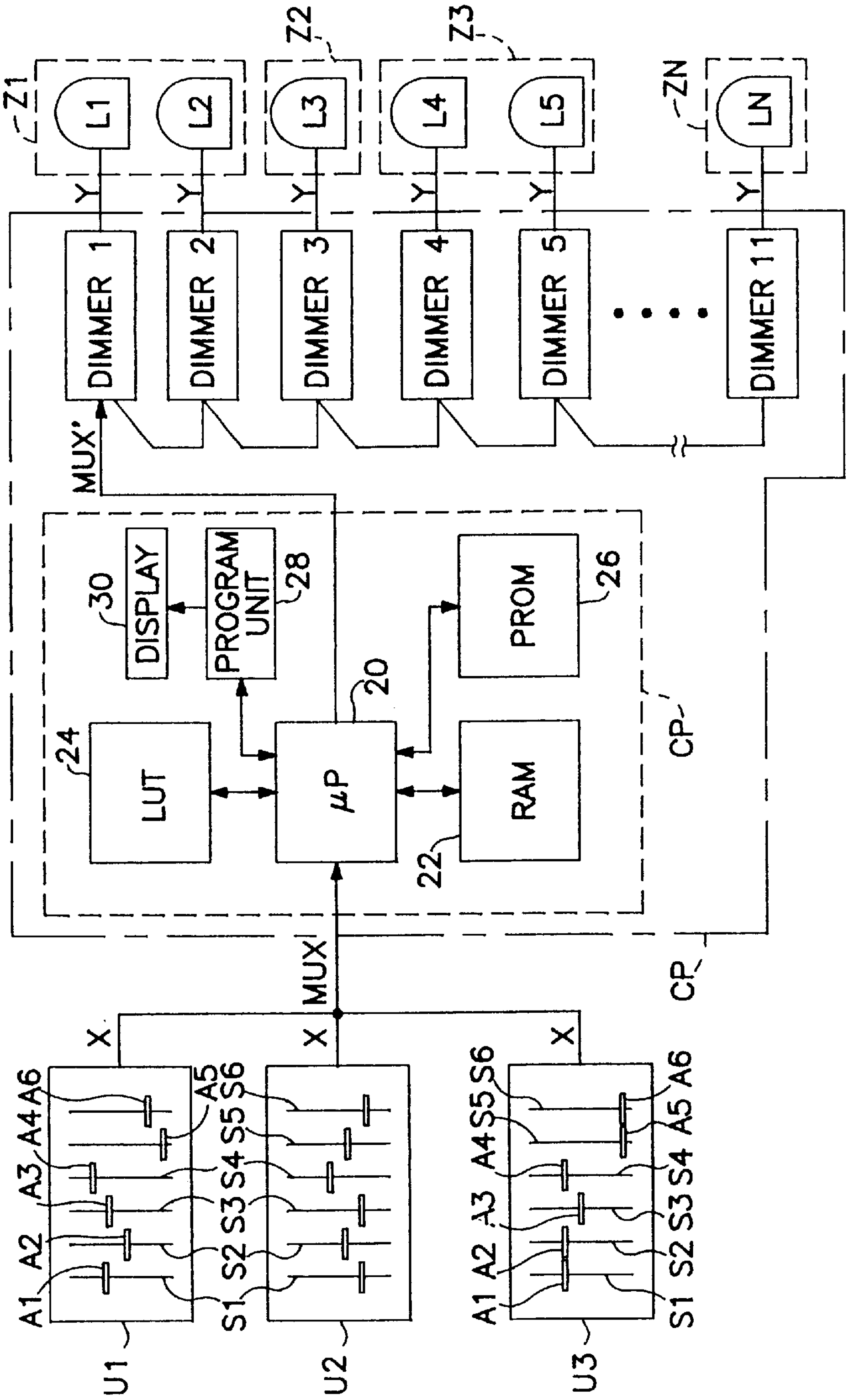
FIG. 1 is a block diagram of a multi-zone lighting control system of the type in which the inventions disclosed herein are useful.

Referring now to the drawings, FIG. 1 schematically illustrates a multi-zone lighting control system in which a plurality of lighting control units U1, U2, U3 operate through a plurality of dimmers (dimmer 1 through dimmer N) to control the output intensity of a plurality of lighting loads L1 through LN. While each of the lighting loads is schematically depicted as comprising a single fixture, it will be appreciated that each lighting load usually comprises several, and often many, individual lamps of the same type, e.g., all being either incandescent, fluorescent, neon, etc. As shown, the lighting loads may be grouped together to define a plurality of lighting zones Z1, Z2, Z3, . . . ZN, the light intensity of each zone being controlled by the output of one or more of the dimmers. In the FIG. 1 system, control units U1–U3 are of conventional design, each comprising a plurality of zone-intensity actuators A1–A6, shown as sliders, which can be manually manipulated, such as raised or lowered within slots S1–S6, respectively, to vary a characteristic of a lighting control signal produced at the output x of each unit. As explained below, the respective outputs of the control units serve to control the respective outputs Y of the dimming modules and, hence, the light intensity of the lighting zones. Each of the actuators A1–A6 controls one or more dimmers to control the light intensity in a particular lighting zone to which the dimmers are assigned, e.g. actuator A1 of control unit U1 may control the lighting intensity in zone Z1 by controlling the outputs of dimmers 1 and 2; actuator A1 of control unit U2 may be assigned to control the output of dimmer 3 which controls the lighting intensity in zone Z2; and actuator A4 of control unit U3 may be assigned to dimmers 4 and 5 which control the lighting intensity in zone Z3. In the control units shown, physically moving the slide actuator in the slot acts to raise or lower the light level. In some control units, however, the zone-intensity actuator may take the form of a pair of UP/DOWN push buttons which, through suitable circuitry, have the same effect on the control unit output. Suitable control units for the FIG. 1 system are the so-called Grafik Eye Lighting Controls, Models 3000 or 4000, made by Lutron Electronics Co., Inc.

Figure 2:
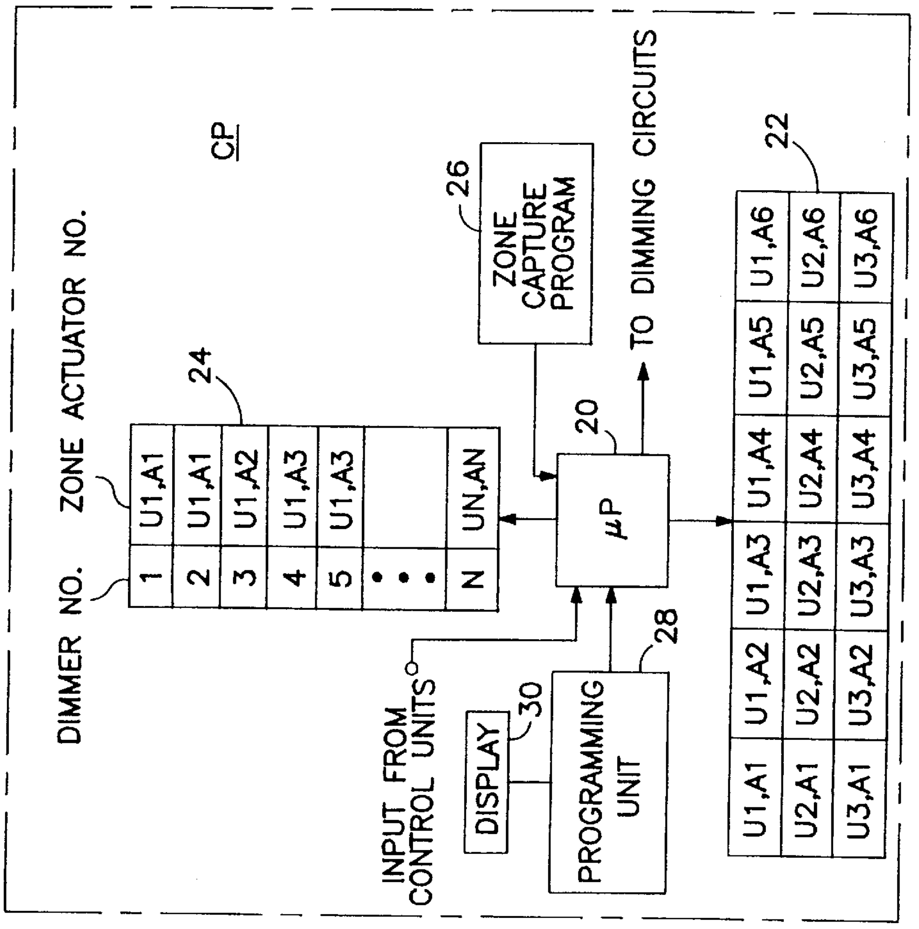
FIG. 2 is a more detailed block diagram of the dimmer control panel of the FIG. 1 system.

Lighting control units U1–U3 are usually wall-mounted devices, each being mounted in a wallbox located in the vicinity of the lighting fixtures they control. The control units communicate with the various dimming modules through a programmable dimmer control panel circuit CP which, together with the dimming modules, is housed in a power cabinet PC located remote from the controls and lighting fixtures, e.g. in a power control room. The dimmer control panel circuit includes a microprocessor 20, such as a Motorola Model 68HC11E9, eight-bit microcontroller, which receives multiplexed zone-intensity information transmitted by the control units over a digital communications link MUX. Upon being sequentially polled in a conventional manner, each control unit transmits, in accordance with an established protocol, a serial message on the link, such message representing digitally encoded zone-intensity information determined by the position of its six zone actuators. Polling of the control units is typically effected at a relatively fast rate, e.g., once every 100 ms., each control unit taking its turn in a predefined time-slot. Upon receiving and de-multiplexing the zone intensity information from the lighting control units, the microprocessor stores this information in a conventional random access memory (RAM) 22, updating the memory with fresh intensity information during every poling cycle. As shown in FIG. 2 which illustrates certain preferred details of the dimming control pane circuitl, the zone-intensity information is stored in tabular form, each box (e.g., U1, A1, which identifies actuator A1 of control unit U1) containing eight bits of zone-intensity information for the associated zone actuator for the preceding polling cycle. In the system depicted in FIG. 1, there are a total of eighteen zone actuators; hence, RAM 22 must accommodate eighteen intensity levels, one for each actuator.

Still referring to FIGS. 1 and 2, the dimming control panel circuit further comprises a look-up table (LUT) 24, preferably a standard electrically erasable read-only memory (EEPROM); a programmable read-only memory (PROM) 26 (described in considerable detail below); and a programming unit 28 including an interactive display 30 through which the look-up table can be programmed to assign each dimming module to a particular zone actuator. While shown separately, it will be appreciated that the look-up table and PROM are often integral portions of the microprocessor and, in fact, are part of the Motorola microcontroller mentioned above. In the example shown in FIG. 1, it is shown that dimmers 1 and 2 control the lamps in lighting zone Z1. Therefore, in setting up the lighting system, it is necessary to assign dimmers 1 and 2 to a single zone actuator, and to store that assignment in the look-up table. As shown in FIG. 2, dimmers 1 and 2 have been assigned to zone actuator U1,A1, i.e. actuator A1 of control unit U1. This assignment is normally achieved by appropriately programming LUT 24 through the programming unit 28. Similarly, FIG. 1 shows that dimming module 3 controls the lamps of zone Z2. In FIG. 2, it is shown that the look-up table has been programmed to assign actuator U1,A2 to this particular lighting zone. Further, it is shown in FIG. 1 that dimmers 4 and 5 control the lamps in zone Z3. Referring to FIG. 2, control of these dimmers has been assigned in the look-up table to zone actuator U1,A3.

Figure 3:
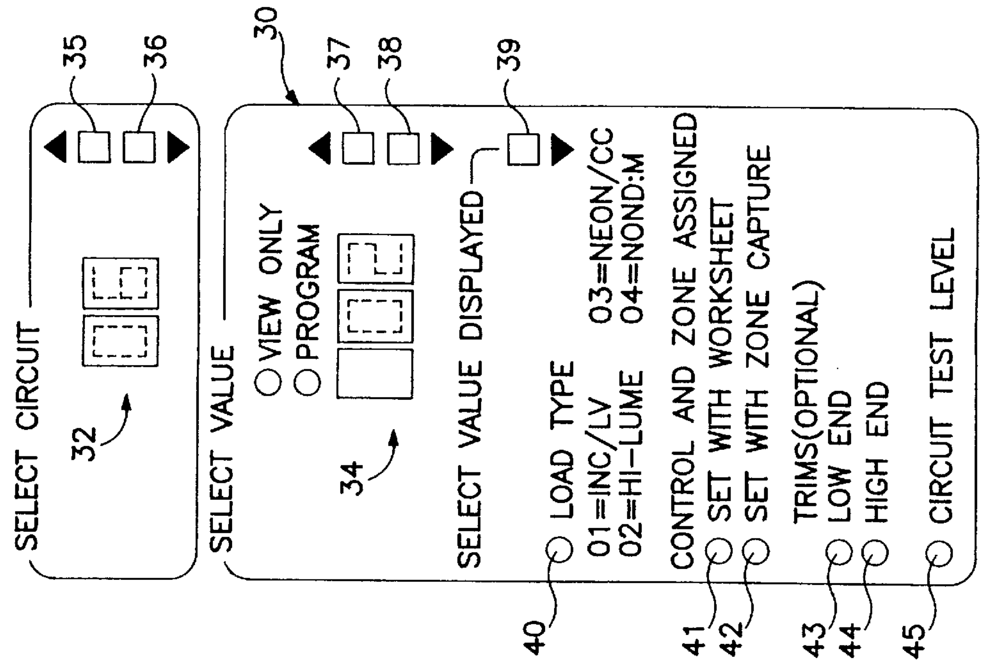
FIG. 3 is a front plan view of an interactive display panel useful in programming the programmable dimmer control panel of the FIG. 1 system.

Referring to FIG. 3, the programming unit 28 includes an interactive display 30 which is illustrated as comprising a pair of seven-segment LED (light-emitting diodes) displays 32,34; a series of push-button switches 35–39; and an array of single LEDS 40–45. Display 32 is part of the "Select Circuit" portion of the programmer display and is adapted to show a number representing a particular dimming circuit number. A desired dimming circuit number is selected by repeatedly depressing the appropriate UP/DOWN buttons 35,36 until the display 32 shows the desired circuit number. Assignment of the selected circuit to a particular zone actuator is achieved in the "Select Value" portion of display 30.

Upon selecting the desired dimmer and entering a program mode (e.g., by depressing buttons 35 and 39 simultaneously for a predetermined time period), button 39 is repeatedly depressed, thereby causing the LED's 40–45 to become illuminated, one at a time. These LED's respectively identify various internal programs that are stored in PROM 26, each program enabling the user to adjust certain dimmer parameters and store certain values. When LED 40 is illuminated, for example, a program is accessed which allows the user to chose one of four different load types (i.e. incandescent or low voltage, fluorescent, neon or cold cathode, or non-dimmable) by depressing the UP/DOWN buttons 37,38 until the number (from 01 to 04) is shown on display 34. Based on the load type chosen, the programming unit causes the microprocessor 20 to transmit a load-type signal to the selected dimming module, causing the dimming module to chose an appropriate calibration curve (stored in memory of the dimming module) for dimming the lamps controlled thereby. When LED's 43 or 44 are illuminated, programs are accessed which allow the user to set either the lowest or highest intensity level available for the selected dimmer. When LED 41 is illuminated, the operator can assign a desired zone actuator to the selected dimmer through the interactive display. At this time, the seven-segment display 34 alternately displays, for one second intervals, a particular control unit number, e.g. U1, and a particular actuator number, e.g., A1. By depressing the UP/DOWN buttons 37, 38 at the appropriate time, the operator can increment the displayed number by one and thereby select a desired control unit and zone actuator. Having selected both the dimming circuit number and actuator number, the microprocessor assigns (or re-assigns) this particular actuator to the selected dimming circuit after a preset time interval has elapsed, and stores this assignment in the look-up table LUT 24.

As may be appreciated, assigning a particular zone actuator to a dimmer in the manner described above requires knowledge by the programmer of the actuator symbology. At initial set-up of the system, there is always some documentation, e.g., a work sheet, that correlates these two variables, control unit number and actuator number, in a symbology understood by the microprocessor. With the passage of time, however, such documentation often disappears, and even the smallest change in actuator assignments, or the addition of a new circuit to the system, often requires a service call to the system installer who presumably has retained the necessary documentation to make a change.

Figure 4A:
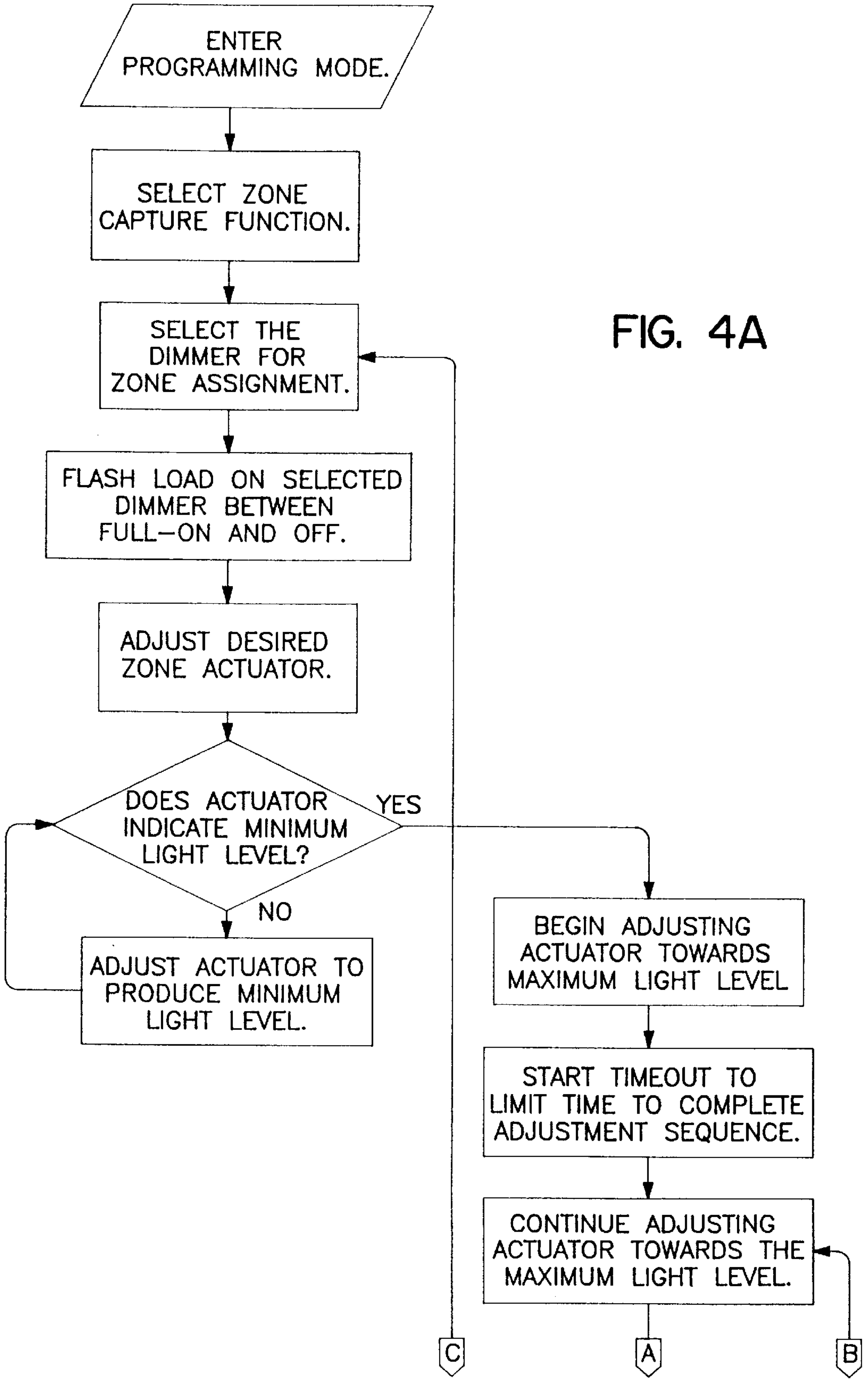
FIGS. 4A and 4B are flow charts of a computer program adapted for use in the FIG. 1 system for assigning a desired zone-intensity actuator to a selected dimmer.
Figure 4B:
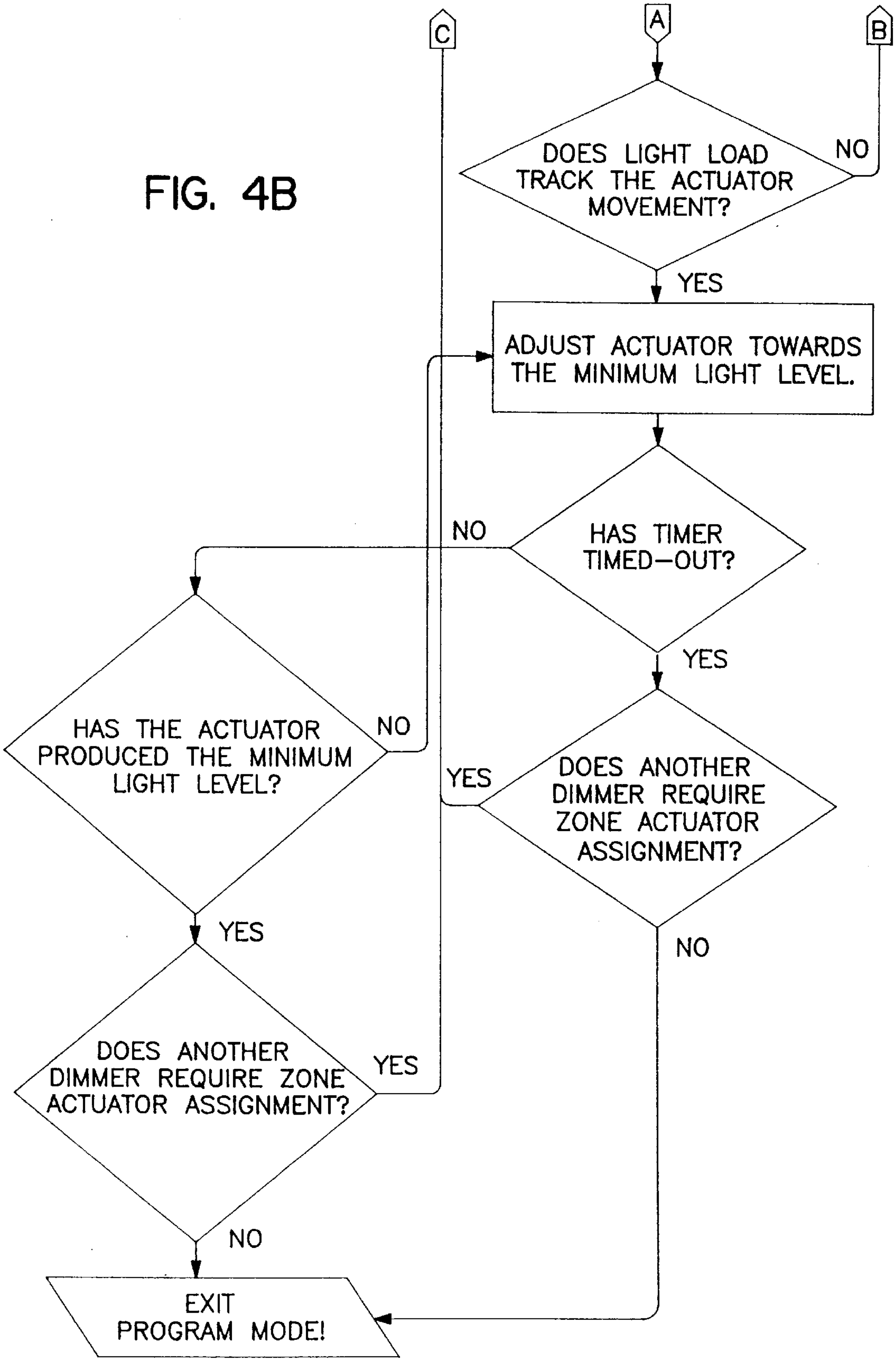

According to a one aspect of this invention, the above-noted difficulty in making modifications to an existing lighting system of the type described is alleviated by the provision of a computer program that obviates the need for any documentation in order to re-program the look-up table 24 with new zone actuator assignments. According to a preferred embodiment, this program, which is stored in PROM 26, causes the apparatus to carry out the sequence of steps shown in the flow chart of FIG. 4. Upon entering a programming mode as described above, pushbutton 39 is repeatedly depressed until LED 42 is illuminated. This LED indicates that the "Zone Capture" program has been accessed. The operator then selects a dimming circuit for zone actuator assignment by depressing UP/DOWN buttons 35,36. Having made the circuit selection, the microprocessor outputs a signal to the selected dimmer, causing the lamps on the selected circuit to repeatedly flash, full ON and OFF. This flashing is intended to give the operator a visual indication of the lights controlled by the selected dimming circuit. The operator then goes to the specific actuator which is intended to be assigned to the selected dimming circuit and physically moves or manipulates the actuator so as to request a minimum light level. In the control shown in FIG. 1, the operator would move the slider to the bottom of its respective slot. Upon detecting that any of values stored in RAM 22 are at the minimum allowed level, the microprocessor sets a binary bit or flag. Having manipulated an actuator to request minimum light level, the operator is then required to manipulate the actuator towards a position requesting maximum light intensity, e.g. moving the slider towards the top of the slot. At this time, the microprocessor starts an internal timer which sets a time period (e.g. 5 seconds) during which the next sequence of events must be completed in order to assign the manipulated actuator to the selected dimming circuit. The operator then continues adjusting the slider towards a position requesting maximum light level. During this time, the microprocessor monitors the intensity values of the zones for which a flag was set at the beginning of the timing period. As soon as one of the zones, presumably the zone whose actuator is being adjusted, reaches a predetermined value, say, 50% of maximum value, the microprocessor causes the light intensity of the lamps on the selected dimmer circuit to stop flashing and track (in intensity) the adjustment or movement of the actuator. At this point, the selected dimmer has now been "captured" by the actuator. Upon noticing that the lamp(s) on the captured dimmer are tracking the actuator adjustment, the operator begins to adjust the zone actuator in such a manner as to again request minimum (e.g. zero) light intensity. If the actuator has arrived at the minimum light level setting before the internal timer times-out, the selected dimmer will be "locked" to the adjusted actuator, i.e. the microprocessor will re-program the look-up table so as to assign the manipulated actuator to the selected dimmer. If the internal timer times-out before the actuator arrives at the minimum light level setting, the program returns to the dimmer-selection step, and the associated lamps on the selected dimmer begin to flash ON/OFF again.

By virtue of the above apparatus, it will be appreciated that a user can re-configure an entire lighting system, i.e., re-assign any or all of the actuators to different dimmers, without ever having any knowledge of the symbology used in initially programming the system. Similarly, dimmers can be added to existing zones, or assigned to previously unassigned actuators without knowledge of the actuator "numbers."

Figure 5:
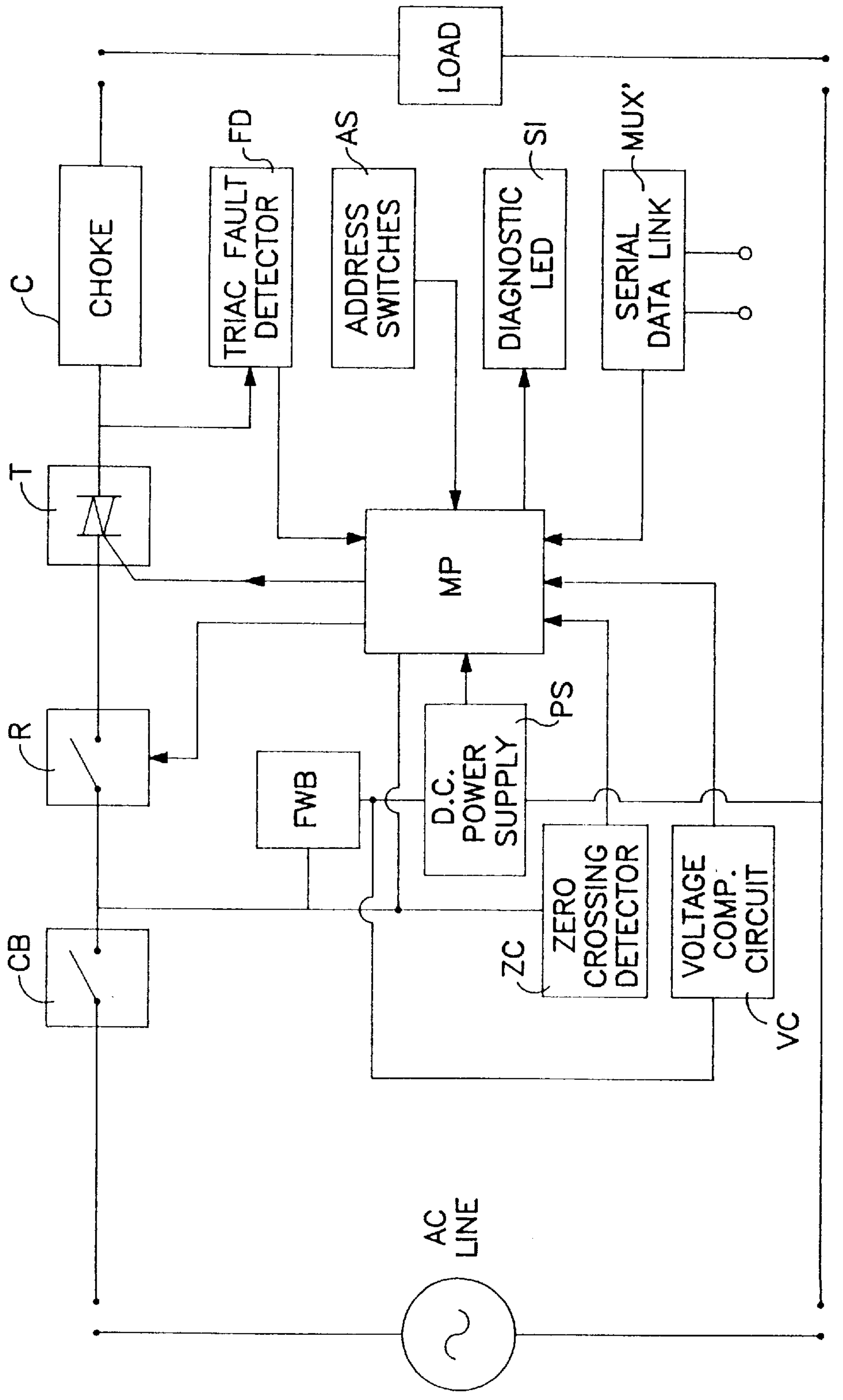
FIG. 5 is a block diagram of a digital dimmer embodying various aspects of the invention.

Referring to FIG. 5, there is shown a functional block diagram of each of the dimmers discussed above. The general purpose of each dimmer is to provide a phase control output to its associated lighting load LL to control the RMS voltage across the load and, hence, its luminous intensity. As discussed below, each dimmer is adapted to operate on a wide range of input voltages from 80 VAC to 277 VAC, 50 or 60 Hz. A circuit breaker CB functions in a conventional manner to provide AC overcurrent protection. It also functions as a means for removing power to a dimmer, each dimmer having its own breaker. A relay R serves to break power to the load and operates under the control of a microprocessor MP. The switched power of the relay serves to provide power directly to a controllably conductive device, preferably a triac T, and it can also be used to provide a switched hot output necessary for dimming fluorescent loads. The microprocessor controls the turn on sequence of the relay and triac so that the relay contacts are closed with no current through them. The triac responds to a control signal on its gate lead to selectively conduct a portion of the AC line voltage during each half cycle thereof, whereby the RMS voltage across the load can be varied. The triac's ON time is controlled by the microprocessor and is based on the digital values received on the communications link MUX' from the control assigned thereto. As discussed below, a plurality of address switches provide each dimmer on the communications link a unique address so that each dimmer can identify zone intensity information intended for it.

Each dimming circuit also includes a full wave bridge circuit FWB which rectifies the AC line voltage to provide the DC voltage needed to operate the microprocessor and relay coil. A power supply PS uses the rectified AC line voltage to provide 30 volts DC to operate the relay. The power supply also derives a regulated 5 VDC supply to power the microprocessor. A zero-cross detector ZC senses when the line voltage waveform crosses zero and provides an input to the microprocessor for determining the line frequency and phase. A voltage compensation circuit, discussed below, operates to maintain a constant light intensity even when the AC line voltage fluctuates from its nominal value. As also discussed below, the microprocessor is programmed to respond to various inputs, including a triac fault detector FD, to indicate the operating status of the system and various key components. Such status is indicated by a causing status indicator SI, preferably a single LED or other light source, to flash according to a predetermined sequence. A large choke C (e.g. up to 2 or 3 millihenry) is connected in series with the triac output and serves to suppress RFI and reduce lamp buzzing in incandescent lamps.

In the lighting control system described above, it is noted that the dimming control panel circuit CP controls the respective outputs of the dimmers (Dimmer1–Dimmer N in FIG.1). Preferably, communication between the control panel circuit and dimmer circuits is carried out on a two-wire serial data link MUX' to which the dimmers are connected in a daisy-chain fashion. So that each dimmer responds only to intensity information intended for it, each dimmer is commonly assigned a different binary or digital address. In prior art systems, such addressing has been achieved either by an array of bi-stable "DIP" switches, each having an actuator that can be moved between two stable positions, or a rotary, multipositional selector switch which, based on the position of a rotatable selector element, determines the dimmer address. In the event a dimmer requires replacement, it will be appreciated that the new unit must have the same address as the defective unit. This requires some attention to detail by the servicing personnel in that an unobserved accidental movement of one of the switch actuators on the DIP switch array, or a rotation of the selector element of the defective unit prior to setting the address of the new unit can be problematic in setting the address of the new unit. Ideally, the replacement dimmer should be self-addressing so as to eliminate human involvement in the addressing process.

According to a second aspect of this invention, there is provided a digital dimmer that automatically addresses itself as it is mounted on a support plate. The features which enable it to be self-addressing are better shown in FIG. 6. As shown, each dimmer module, designated as reference character 50, comprises a housing 52, e.g., a circuit board, which is mountable in a predetermined location L' (shown in phantom lines in FIG. 6) on a support plate SP. The dimmer circuit board supports the various electronic components (discussed below with reference to FIG. 12) required to vary the intensity of a lighting load in response to receiving a suitable lighting control signal. As noted above, such components include a triac T which is used to selectively interrupt power to the load to dim its output. According to a preferred embodiment, each dimmer module 50 has a unique binary address code determined by an array of normally open address switches 56–60, located at the periphery of the circuit board, and means associated with the support plate for selectively changing the conductive state of one or more of the switches as the dimmer module is mounted in a predetermined location L' on the support plate. Preferably, each of the switches is of the type which includes a movable plunger P which, depending on its extended or retracted position, determines the conductive (open or closed) state of its associated switch. Normally, the plunger of such switches is spring-biased towards its extended position, in which case the switch is normally open. Preferred address switches are the "Detector Switches," made by Matsushita Electronics Components, Co. When address switches of this type are used, the switch-closing means on the support plate may take the form of an array A of holes H having lands L therebetween and on opposite sides thereof. When the dimmer module is properly positioned on the support plate, the holes act to allow some of the plungers to remain in their normally extended position, thereby allowing their respective switches to remain open, while the lands act to selectively depress the remaining switch plungers, thereby closing their respective switches. Thus, it will be appreciated that the dimmer's address is determined by the hole/land pattern opposite the position in which it is mounted. By using different hole/land patterns, each dimmer module can receive a unique binary address code. Preferably, a plurality of dimming modules are mounted on the same support plate and, opposite each position on the plate which is to receive a dimmer module, a different hole/land pattern is formed.

In the self-addressing scheme described above, each of the address switches includes a pair of contacts which are shown in the electrical schematic of FIG. 12. One contact of each pair is connected to a voltage source. In response to switch closure, a signal appears at the switch output. The respective outputs of the address switches serve as High/Low inputs to a microprocessor forming part of the dimmer. Prior to accepting intensity information from the dimmer control panel over the multiplex link, the binary address produced by the address switches must match the address transmitted on the serial data link.

Figure 6:
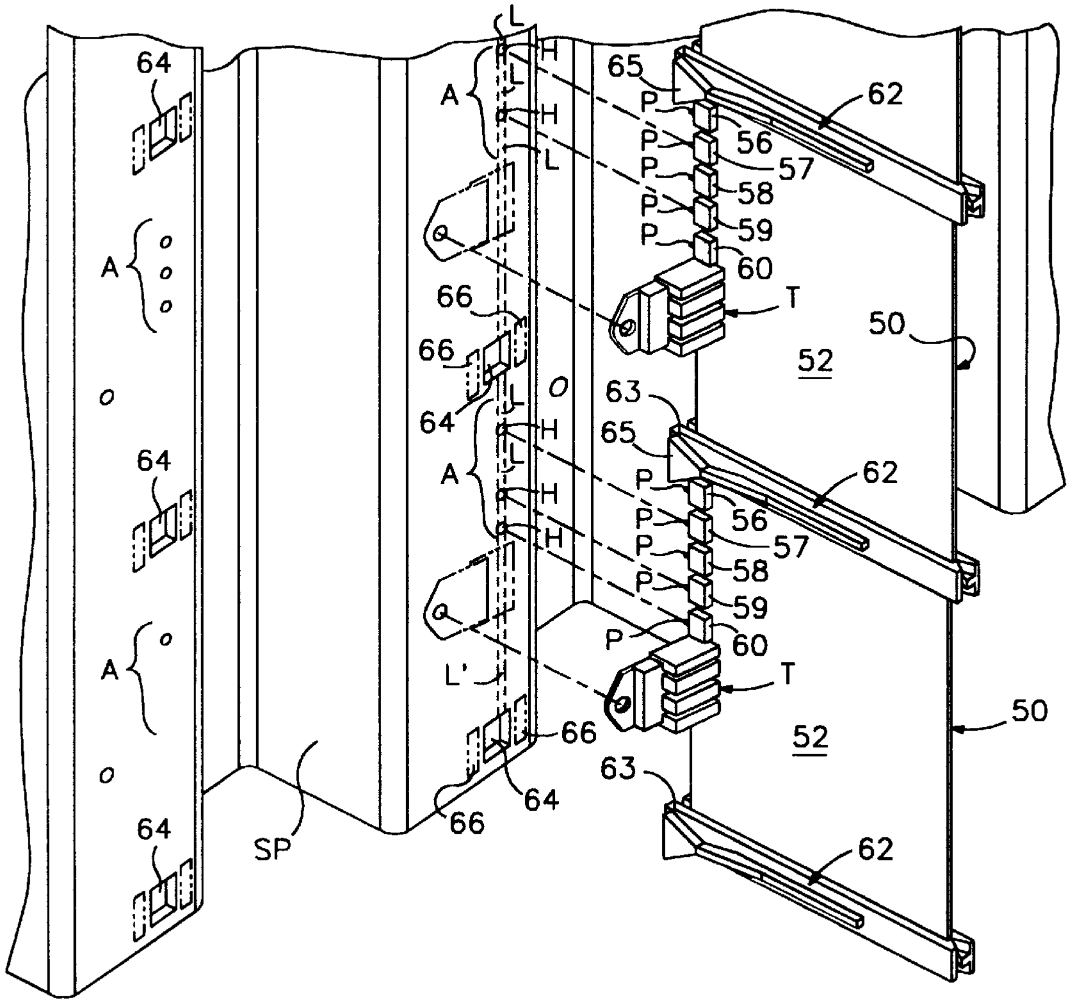
FIG. 6 is a perspective view of a portion of a support plate adapted to support a plurality of the dimmers.

In the preferred embodiment shown in FIG. 6, there are a total of five address switches 56–60 which define a five-bit binary address code. Obviously, the number of switches is determined by the maximum number of dimmers allowed on the communications link. As noted, the dimmers have pre-defined mounting locations on the support plate, each of such locations being determined by a pair of spaced guides 62 which engage the lateral edges of a module's circuit board. Each guide is provided with opposing grooves so that adjacent circuit boards can share the same guide. Each guide is provided with a pair of mounting clips 63 which are designed to snap into engagment with apertures 64 formed in the support plate. When the mounting clips are positioned within the apertures 64, a pair of feet 65 on each guide engage the support plate surface at locations 66. When so positioned, guides 62 serve to position the circuit board upright (perpendicular) with respect to the support plate surface.

While the above embodiment uses an array of electromechanical switches and support plate holes and lands to provide the self-addressing feature, other self-addressing schemes come to mind. For example, magnetic address switches can be used which cooperate with a magnetic/non-magnetic pattern on the support plate. Alternatively, photoelectric switches can be used which cooperate with a reflective/non-reflective pattern on the support plate.

Figure 7:
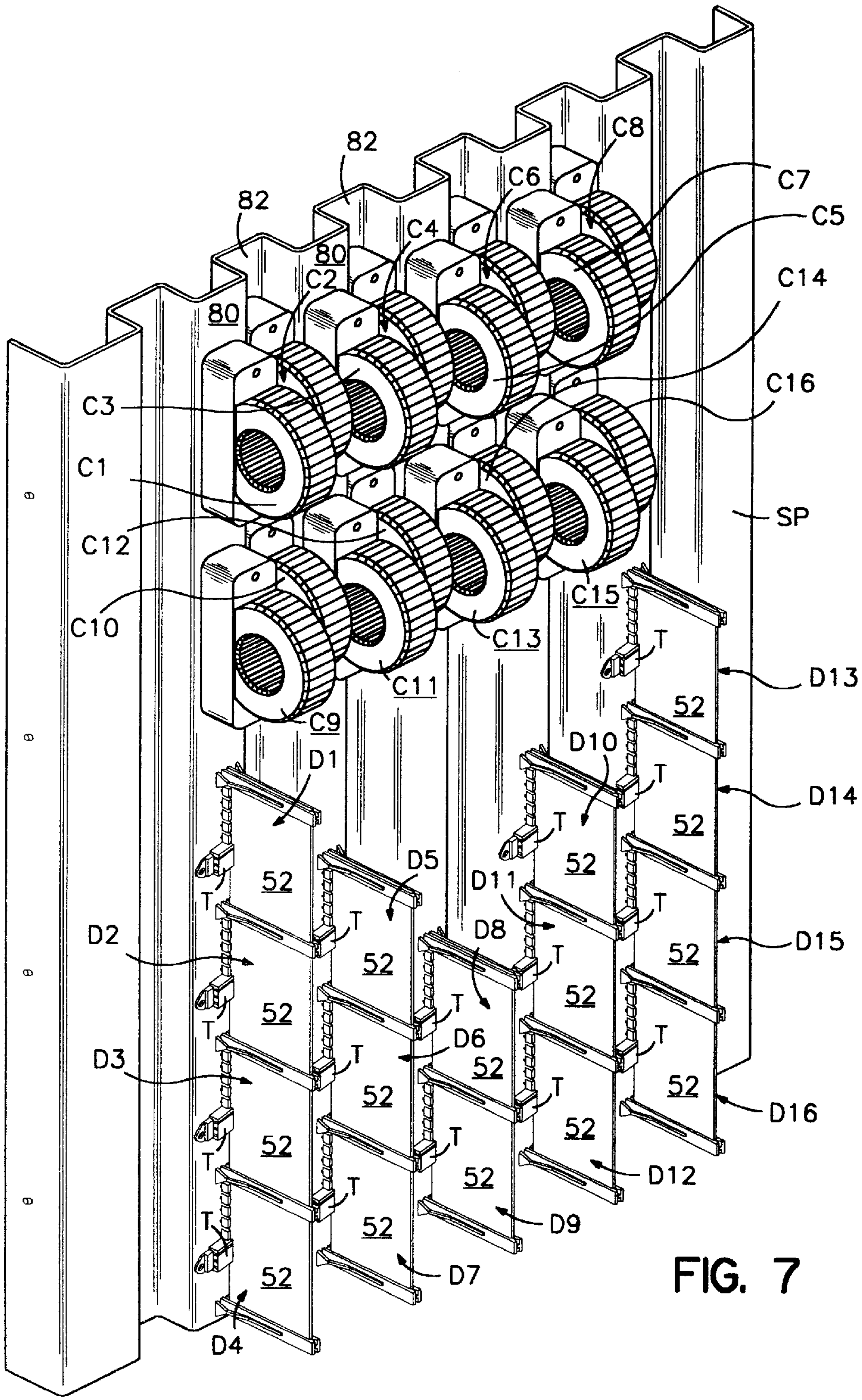
FIG. 7 is a perspective view of a dimming panel illustrating a preferred layout of dimming circuits and chokes.
Figure 8:
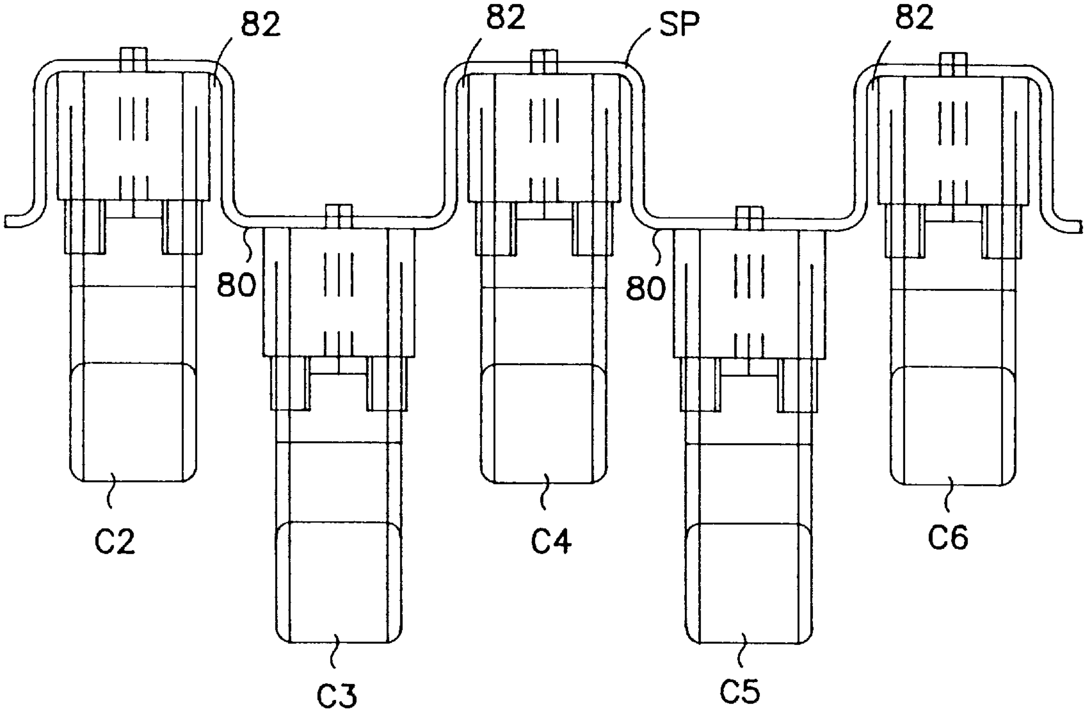
FIG. 8 is an end view of a portion of the dimmer panel shown in FIG. 7.

Referring now to FIGS. 7 and 8, another aspect of this invention relates to the dimmer support plate and the arrangement of the heat-generating dimmer components thereon to achieve a relatively high packing density of dimmer modules. As noted earlier, each dimmer includes, in addition to a triac or the like, a relatively large choke or coil for suppressing RFI. When the dimmer is operating, both of these components generate so much heat that it is common to provide some sort of heat sink for conducting heat away from the other circuit elements to avoid damage or, at least, prolong their useful life. Often, a number of dimmers comprising a dimming panel are supported on a common, heat-conducting, support plate with the heat-generating components of each dimmer being thermally coupled to the plate. Usually, the support plate is a casting or extrusion having a plurality of fins or ribs on the opposite side thereof for radiating the heat conducted thereto into the surrounding air. Ideally, the RFI choke, being the larger producer of thermal energy, should be remotely spaced from its associated dimmer components, but since conventional dimmers are packaged with the choke included, the choke is usually positioned relatively close to its associated circuit components.

As an alternative to using relatively costly castings or extrusion of finned surfaces and the like, and to mounting the choke-containing dimmers side-by-side on a flat, heat-conducting support plate, it is preferred that the support plate take the form of a corrugated metal structure, and that all of the RFI chokes be mounted, side-by-side, in a portion of the plate remote from the other dimming circuit components. Since the chokes are merely copper windings that are relatively insensitive to the high temperature levels that result from grouping the chokes together, there is no disadvantage, other than the necessary rewiring that results, in locating the chokes remote from the dimmers. The advantage of this arrangement is that the heat generated by the triac can be easily dissipated in the support plate, and the semiconductor circuit elements of the dimming module can operate at a low operating temperature, thereby prolonging their life.

Referring FIG. 7, the support plate SP is depicted as a corrugated structure having alternating lands 80 and channels 82. Preferably, the support plate is made of aluminum, about 3 mm in thickness, and the corrugated structure is provided by appropriately bending the plate. Such a corrugated structure has the effect of enlarging the surface area over which heat can be dissipated without enlarging the overall dimensions of the plate. In accordance with a preferred embodiment, the lands and channels are rectilinear, parallel and approximately equal in width, preferably about 40 mm wide, and the depth of the channels is approximately 30 mm. In the dimming panel shown in FIG. 7, sixteen dimmers D1–D16 and their associated chokes C1–C16 are mounted on a common corrugated support. Since the chokes are relatively insensitive to heat, they are mounted as close together as practical, on both the lands 80 and in the channels 82, as better shown in FIG. 8. Since heat rises, it is preferred that the chokes occupy the upper portion of the support plate with the dimmers mounted below. Preferably, the dimmers are mounted on only the land (or the base of the channel) portions of the support plate to provide more thermal isolation from the heat produced by the respective triacs of adjacent dimmers. Since the central region of the support plate will attain a higher temperature than the peripheral portions, it is also preferred that the dimmer modules be arranged in the pattern shown, with gradually fewer modules in the direction of the plate center.

An advantageous technical effect of the corrugated configuration of the support plate is that a chimney effect is created between adjacent lands and channels in which the radiated heat is quickly dispersed in a direction parallel to the longitudinal axes of the lands and channels. This chimney effect is maximized, of course, by arranging the support plate such that the channels extend vertically, whereby the heat generated is free to rise uninhibited. Further, the corrugated configuration of the support plate serves to substantially increase the thermal separation of the dimming circuits. The combination of the corrugated support plate and the remotely located RFI chokes provides a low-cost, yet highly efficient, scheme for reducing the ambient temperature in the vicinity of the heat-sensitive dimmer components, thereby increasing their expected lifetime. Also, as many as twenty-four 16 ampere dimming circuits and their associated 2 millihenry chokes can be housed on a common support plate measuring only about 70 cm. by about 85 cm. in overall dimension.

Figure 9A:
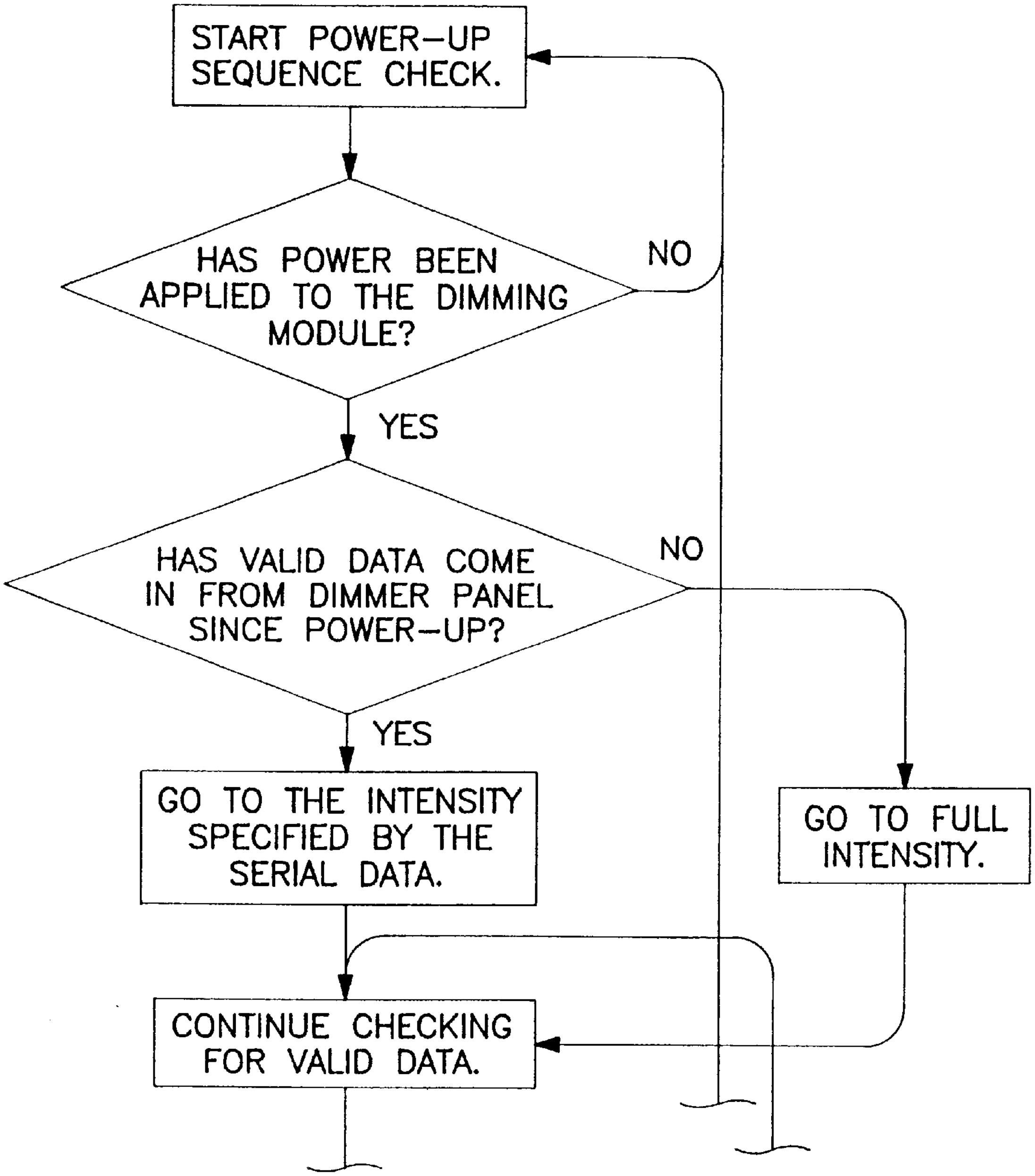
FIGS. 9–11 are flow charts illustrating various programs carried out by the microprocessor component of the dimmer shown in FIG. 5.
Figure 9B:
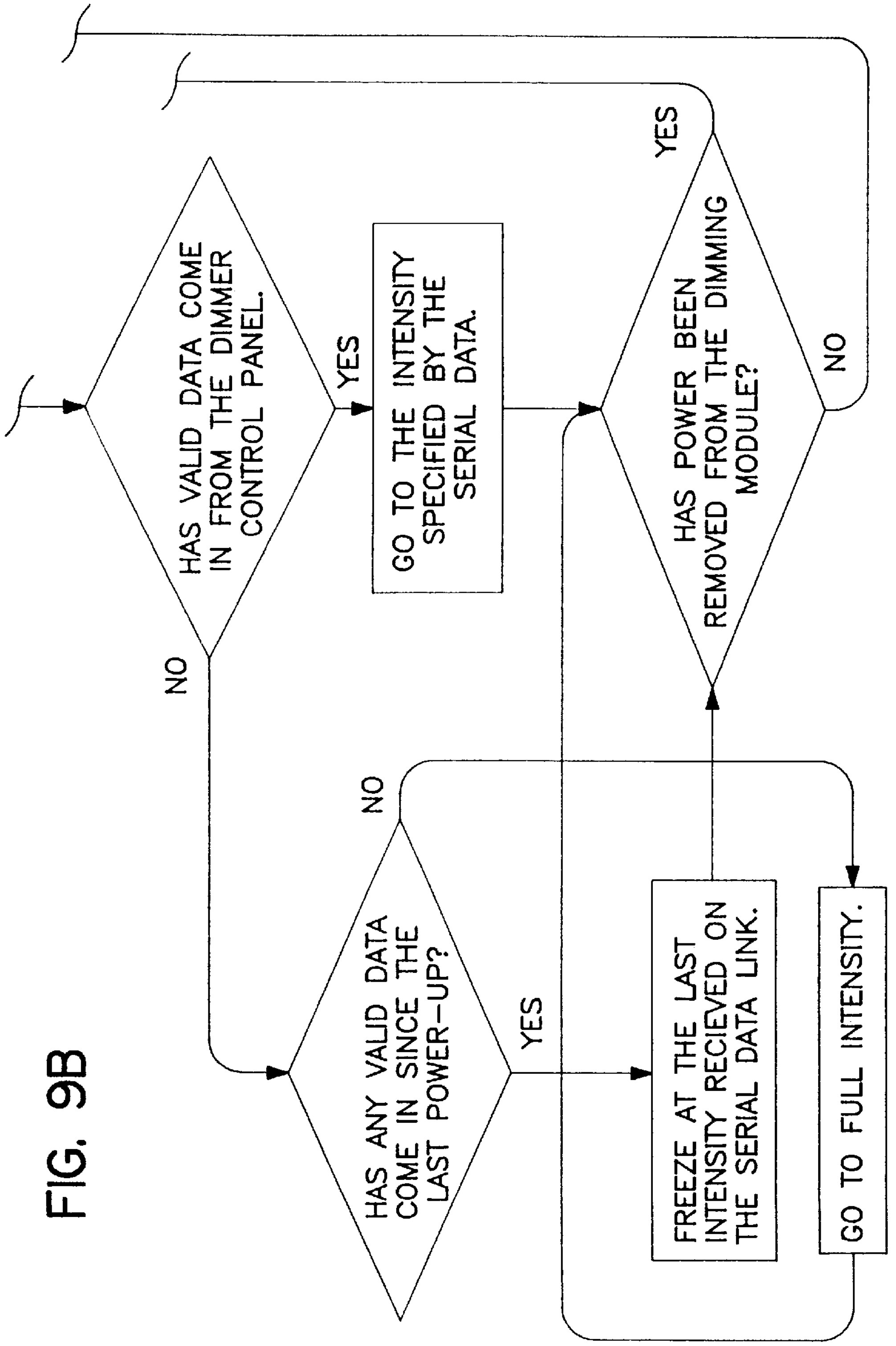

Another aspect of this invention enables a system user or installer to have temporary lighting even in the absence of a dimmer control signal. In the past, a loss or absence of the control signal would necessitate the use of jumper cables or the like to by-pass the dimmer and thereby apply full power to the lighting load. According to this aspect of the invention, the user need only cycle a circuit breaker (i.e., turn the input power circuit breaker off and on) in order to provide temporary lighting of a preset intensity, e.g., full ON. Referring to FIG. 9, the flow chart illustrates preferred steps carried out by the dimmer's microprocessor in implementing this feature.

Upon powering up the system, the dimmer's microprocessor MP determines whether power has been applied to its associated dimmer module. If it has, the microprocessor then determines whether any valid data has been received from the dimmer control panel circuit CP since power-up. This is determined by monitoring the input data on the communication link MUX'. If no data has been received since the initial power-up, the microprocessor operates the triac to provide full power (or any predefined preset level) to the lighting load. If valid data has been received, the microprocessor continues to monitor the communications link for valid data and operates the lighting load at an intensity determined by such data. When the microprocessor determines that valid data is no longer being received, it determines whether valid data has been received since the last power up. If so, it freezes the lamp intensity at the power level requested prior to loss of data. If not, the lighting load is operated at full intensity, or some other preset value. If power has been removed from the dimmer module after the light intensity has been frozen at some level, such as by switching off the circuit breaker, the program returns to the beginning of the program and, as soon as power is restored, such as by switching on the circuit breaker, the microprocessor will operate the lamps at full intensity, or some preset level. If power to the dimmer has not been interrupted after the light intensity has been frozen at some level, the microprocessor keeps checking for valid data on the multiplex link and, until valid data appears, the light level remains frozen. Should valid data eventually appear, the lights are operated at the intensity requested.

From the foregoing, it will be appreciated that the dimmer can be by-passed in the absence of a control signal by simply turning the circuit breaker CB in FIG. 5 off and on. Power to the load will then be controlled strictly by the circuit breaker as if the dimmer was a short circuit. Normal operation will be immediately restored upon detection of a proper multiplex control signal or valid data.

According to another aspect of this invention, the dimmer module of FIG. 5 preferably includes a unique voltage compensation circuit VC which operates to provide a constant lamp output even when the A.C. line voltage fluctuates from a wide variety of nominal values. The voltage compensation circuitry (shown in detail in the electrical schematic of FIG. 12) allows a capacitor to charge up to a reference level during each half-cycle of the A.C. waveform. The microprocessor allows the capacitor to start charging as the A.C. line voltage crosses zero, as determined by the zero-crossing detector ZC, and measures the time it takes to charge to the reference voltage. This charging time is a function of the amplitude of the A.C. line voltage; the higher the line voltage, the faster the charging time. The time measured during each half cycle is compared to a long term (e.g. 15 second) average. An error signal is derived from the comparison, and such signal is used to adjust the triac firing angle in such a manner as to keep the output voltage from changing. The result is that the effects of fast-changing and short lived changes in line voltage, sags and surges, are minimized.

While the voltage compensation scheme described above can be used with any conventional line voltage, it will be appreciated that the nominal charging time will vary substantially with the nominal line voltage. That is, if a single charging capacitor is used for all nominal line voltages, it may be relatively easy, based on its value, to detect variations in charging times at low line voltages, e.g. between 80 and 160 volts, and relatively difficult to detect such variations at high line voltages, e.g., between 160 and 277 volts. Thus, to facilitate the charging time measurement for a wide range of line voltages, it is preferred that two different capacitor values be used, a relatively low value for relatively low line voltages, and a relatively high value for relatively high line voltages. Preferably an additional capacitor is switched into a parallel circuit with the normal charging capacitor when the microprocessor detects that the nominal line voltage exceeds a certain level (e.g., 160 volts).

Figure 10A:
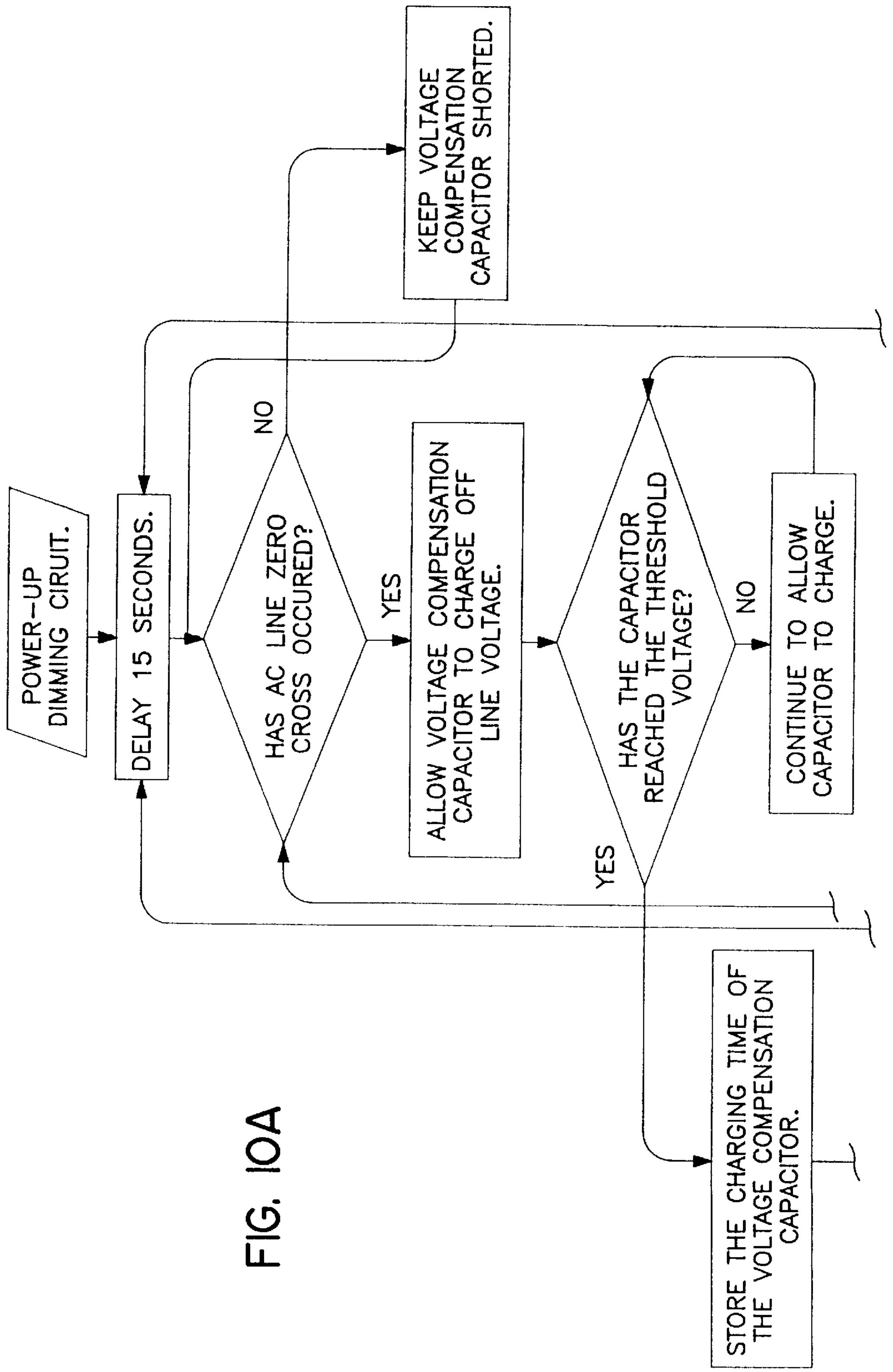
Figure 10B:
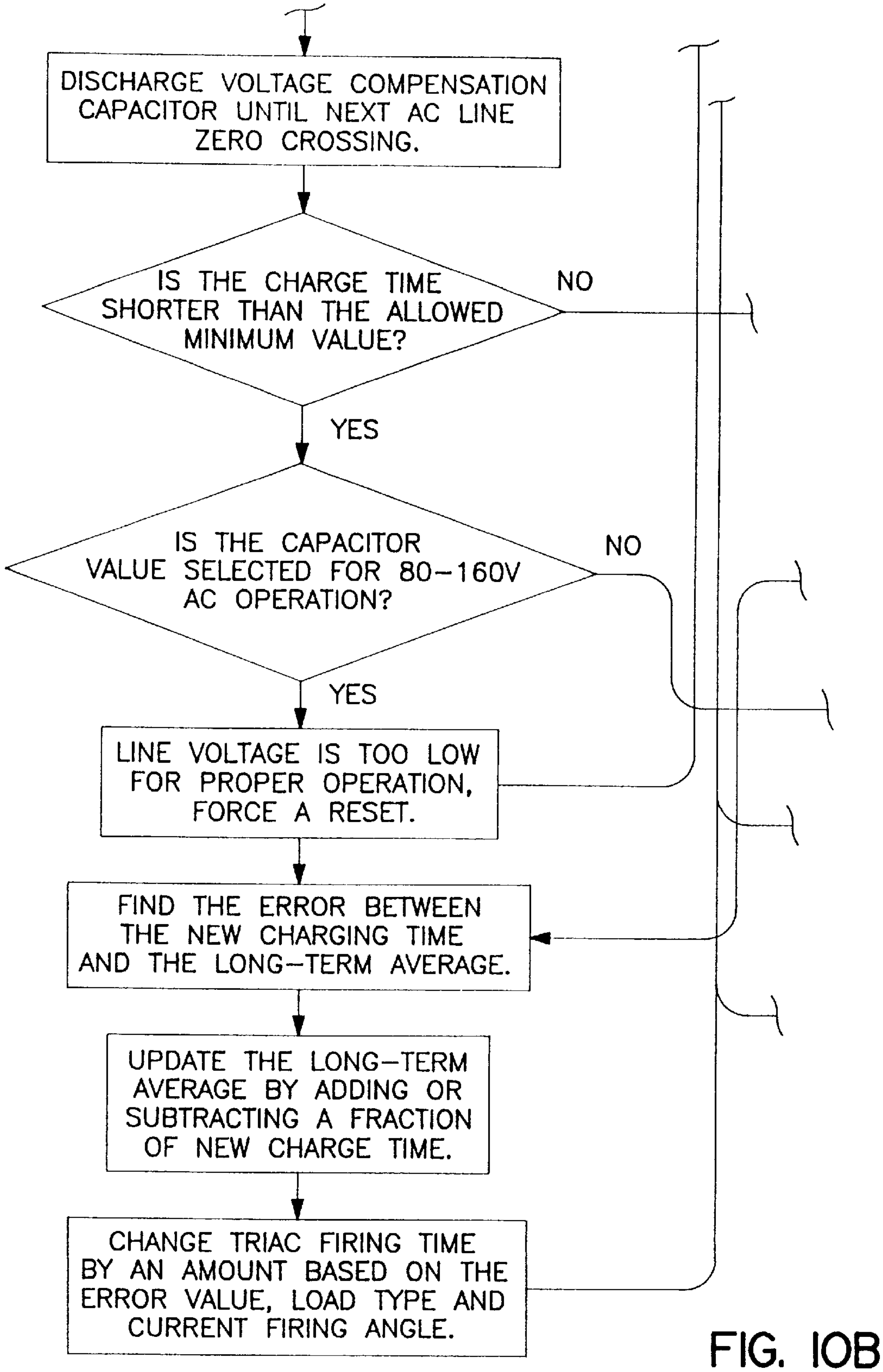
Figure 10C:
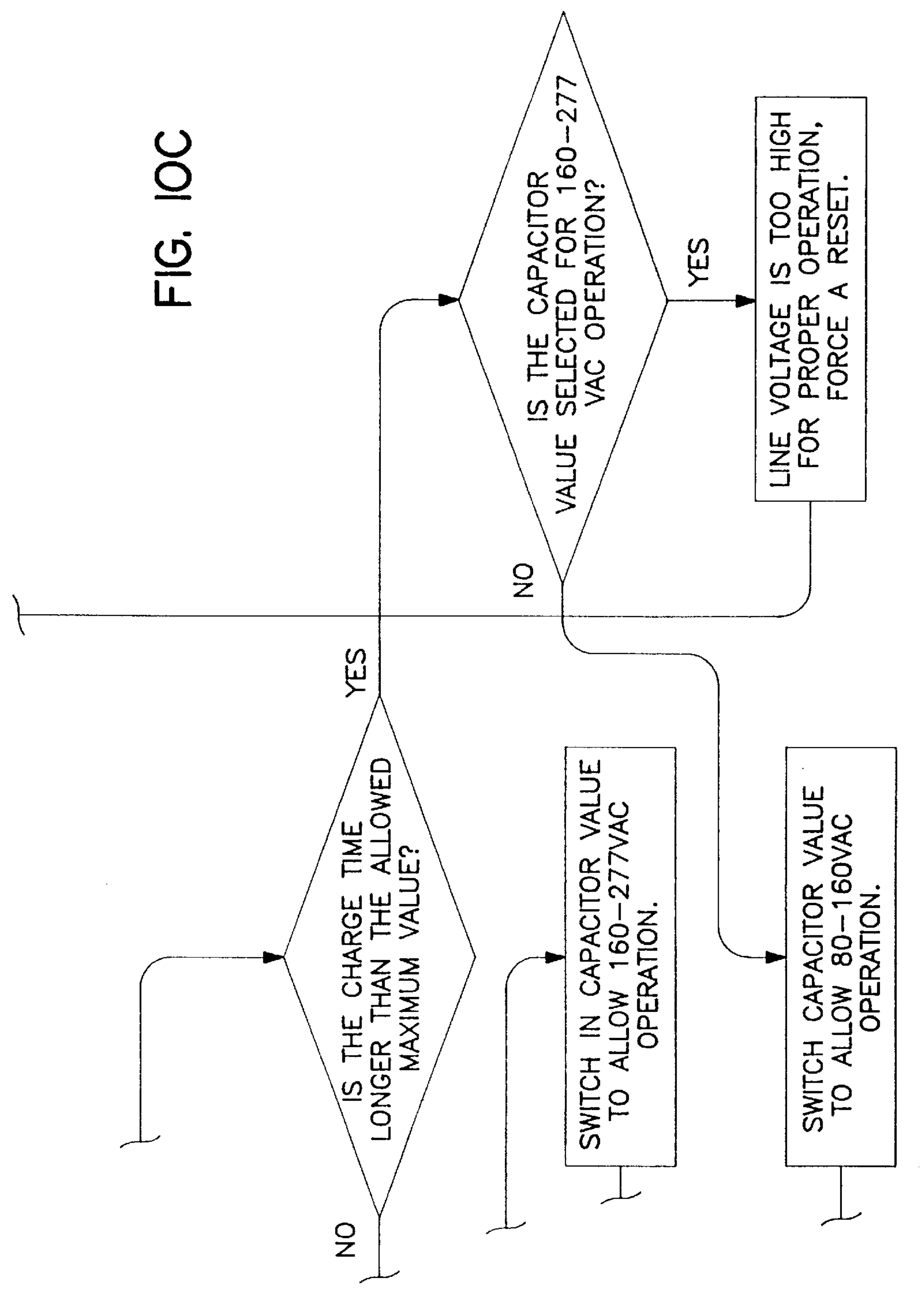

The steps carried out by the microprocessor in compensating for line voltage fluctuations are shown in FIG. 10. Upon initially applying power to the dimmer, the microprocessor delays about 15 seconds before providing voltage compensation. This time period allows the microprocessor to determine a "long term" average for the charging time of the capacitor(s). Referring to the electrical schematic of FIG. 12, capacitor C8 is the charging capacitor when the line voltage is between 80 and 160 volts, and capacitors C8 and C9 are the charging capacitors when the nominal line voltage exceeds 160 volts. A zero-crossing detector comprising diodes D4, D5, and resistors R6 and R8, provides the reference point from which the charging time is measured. The zero-crossing detector is connected to the output of the diode bridge DB1 which provides full wave rectification of the A.C line voltage. The output of the zero-crossing detector provides an input to the microprocessor. Until a zero crossing of the line voltage occurs, the microprocessor shorts the capacitor. In response to a zero crossing, the microprocessor allows the capacitor C8 to charge. When a predetermined threshold or reference level is reached, as determined by the values of zener diode D9 and resistor R26, the microprocessor stores the charging time of the capacitor and discharges the capacitor until the next zero crossing. If the measured charging time is shorter than a certain minimum value, the microprocessor then determines whether the charging capacitor selected is adapted for the low nominal voltages. If so, the line voltage is too high for proper operation, and a reset is forced. If the measured charging time is not shorter than the minimum allowed value, then the microprocessor determines whether the charging time is longer than a certain allowed value. If so, the microprocessor determines whether the capacitance adapted for use with high line voltages has been selected. If so, the line voltage is too high for proper operation, and a reset is forced. If not, the lower capacitance is selected, and the program returns to the 15 second delay step. If the measured charging time is neither shorter than an allowed minimum value, nor longer than an allowed maximum value, the microprocessor determines the error between the measured charging time and the long term average. The long term average is then updated by subtracting or adding a fraction of the new charging time, and the firing angle of the triac is adjusted by an amount based on the error, load type and present firing angle.

In multizone lighting systems of the type described, it is often difficult to identify which dimmer module may have failed in the event of a system malfunction. Usually, test equipment and a skilled technician are required. Also, it is necessary to determine whether the malfunction is indeed due to a dimmer failure, or simply a misprogrammed control scheme. Conventional systems use an indicator lamp to indicate a very basic status level, e.g., power on/off.

According to another aspect of this invention, each dimmer is equipped with means for monitoring several status states of the dimmer and for providing a visible indication thereof. Preferably, the status indicator takes the form of a single light source which can be selectively energized in different ways to indicate different status conditions, as diagnosed by the dimmer module's microprocessor MP. Preferably, the diagnostic light source is a conventional LED. In response to different inputs indicative, for example, of the status of the communications link, power to the dimmer module, status of the dimmer's power-switching component (triac), control unit status, etc., the microprocessor causes the LED to "blink" according to a readily recognizable pattern, for example, once every second, once every other second, once every third second, several times per second, etc. The status indicated by the blinking LED is recorded in documentation provided the system user.

Figure 11A:
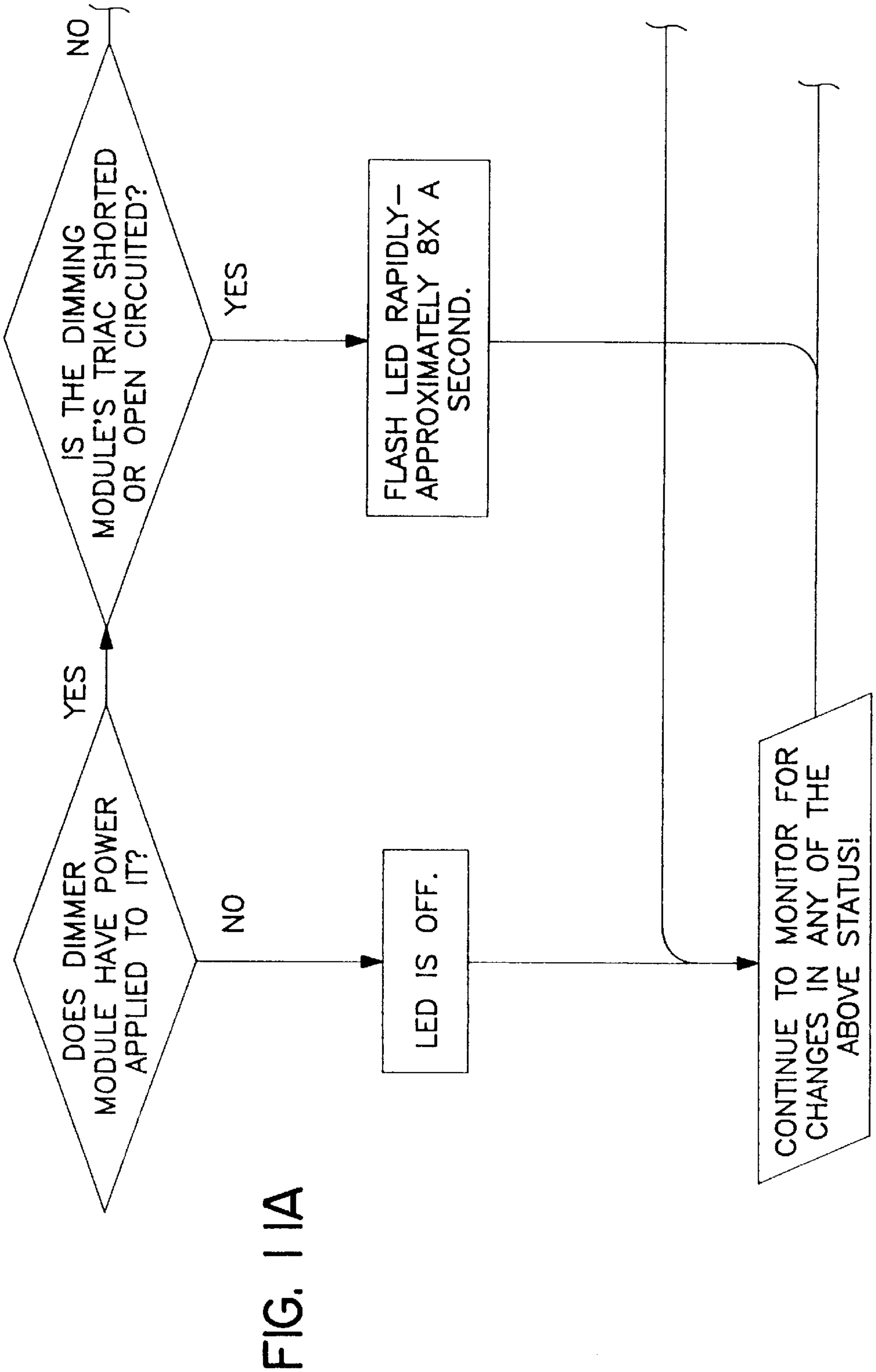
Figure 11B:
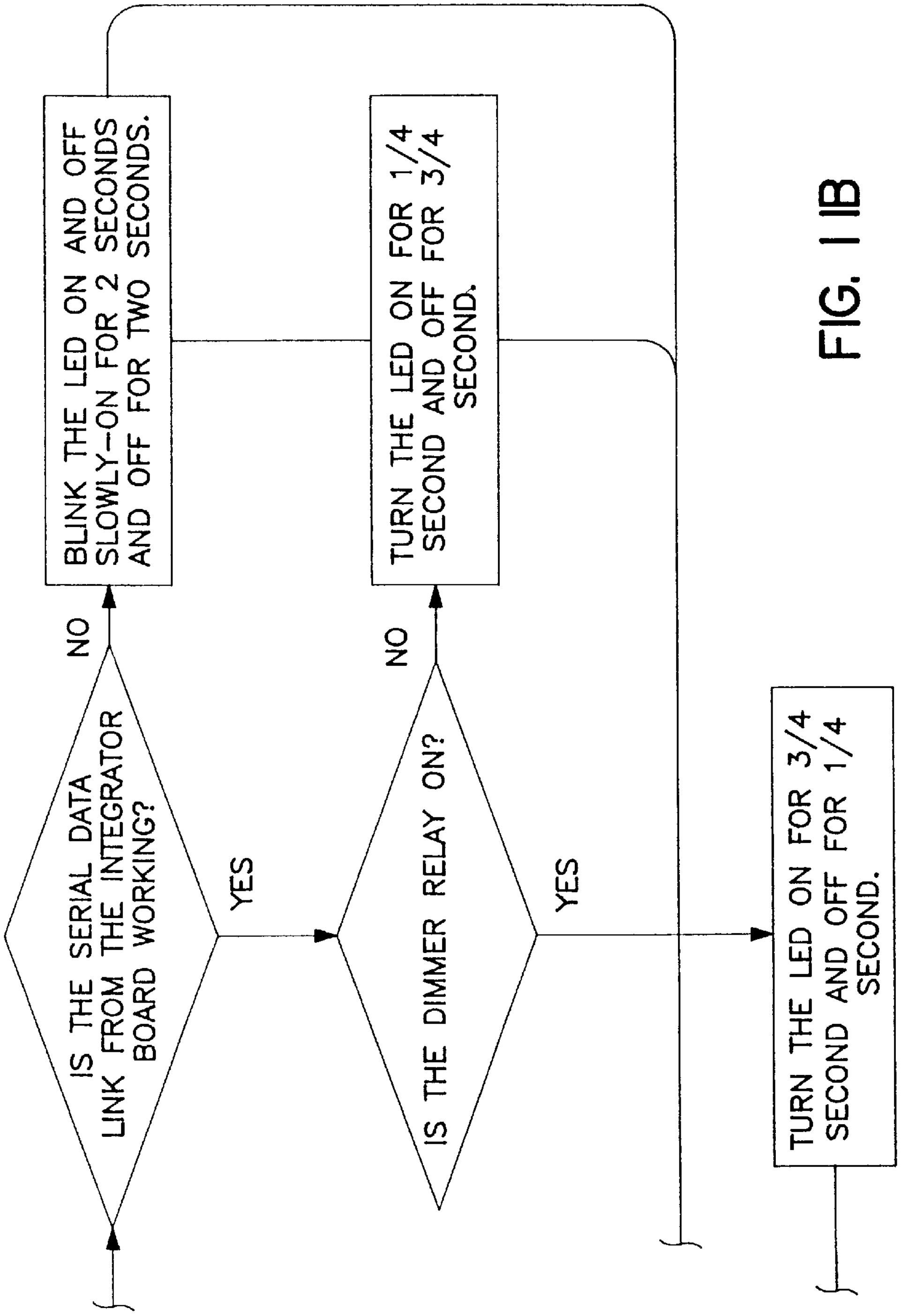
Figure 12A:
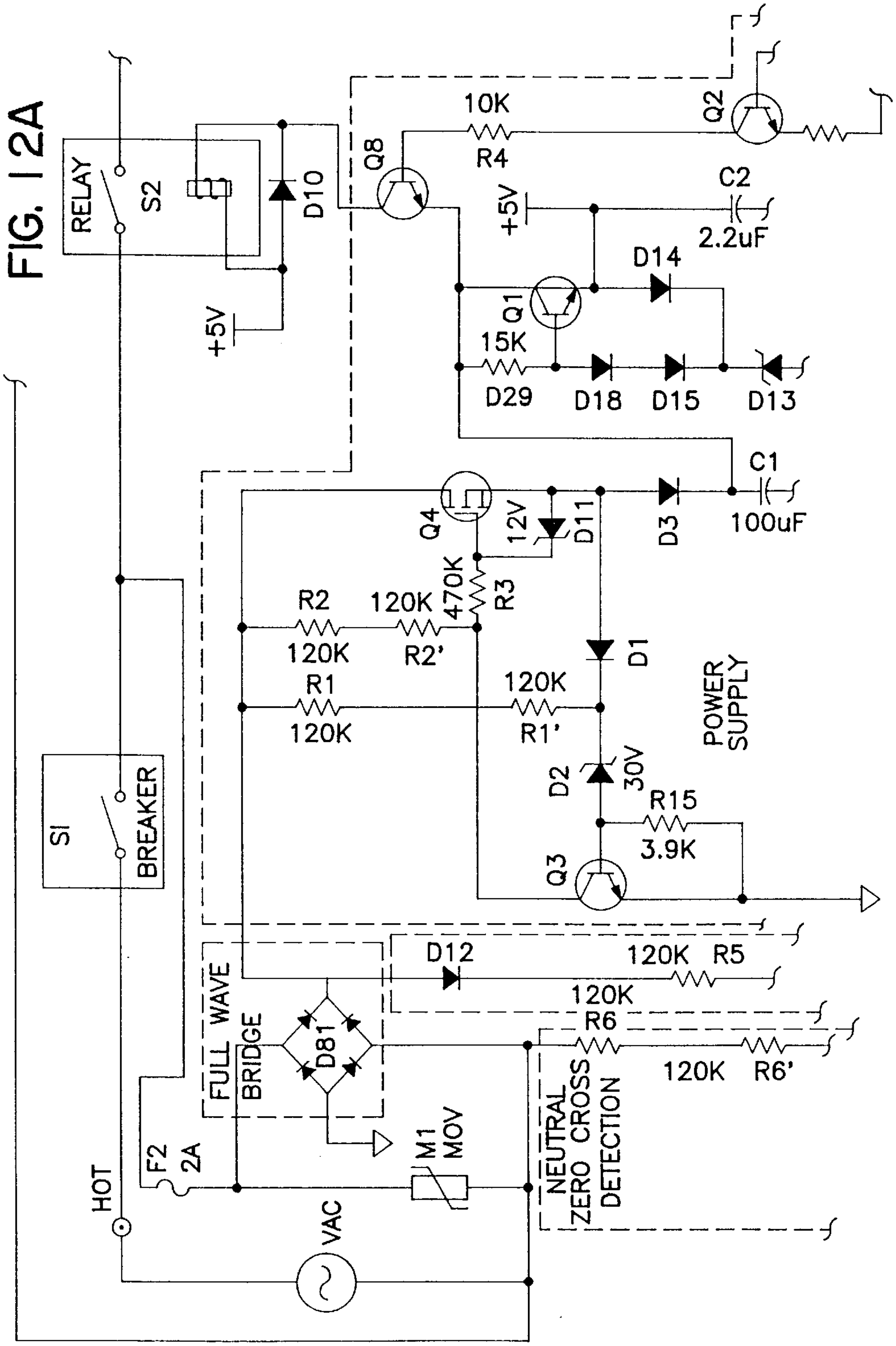
FIG. 12 is an electrical schematic showing preferred circuitry for implementing various aspects of this invention.
Figure 12B:
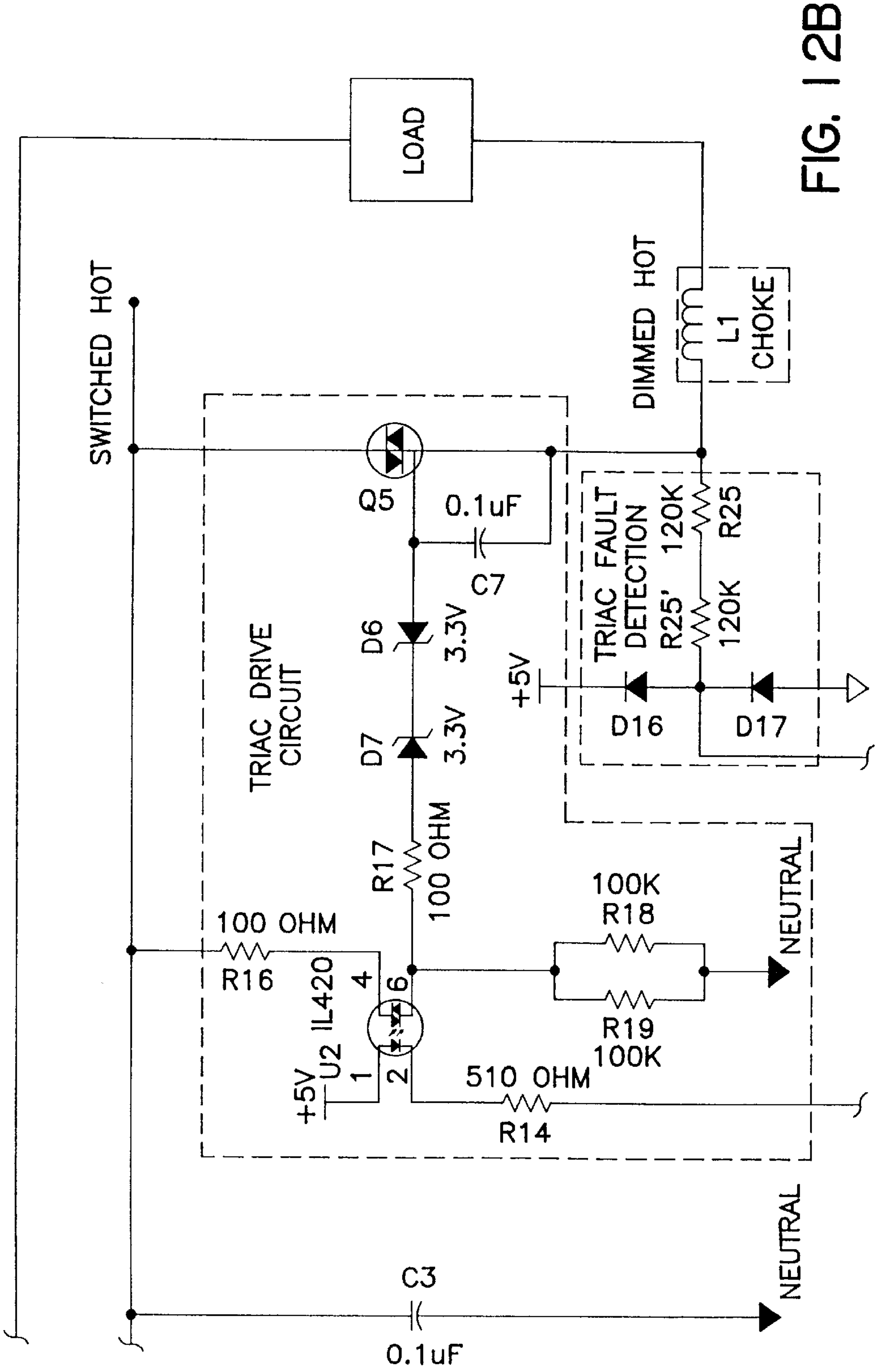
Figure 12C:
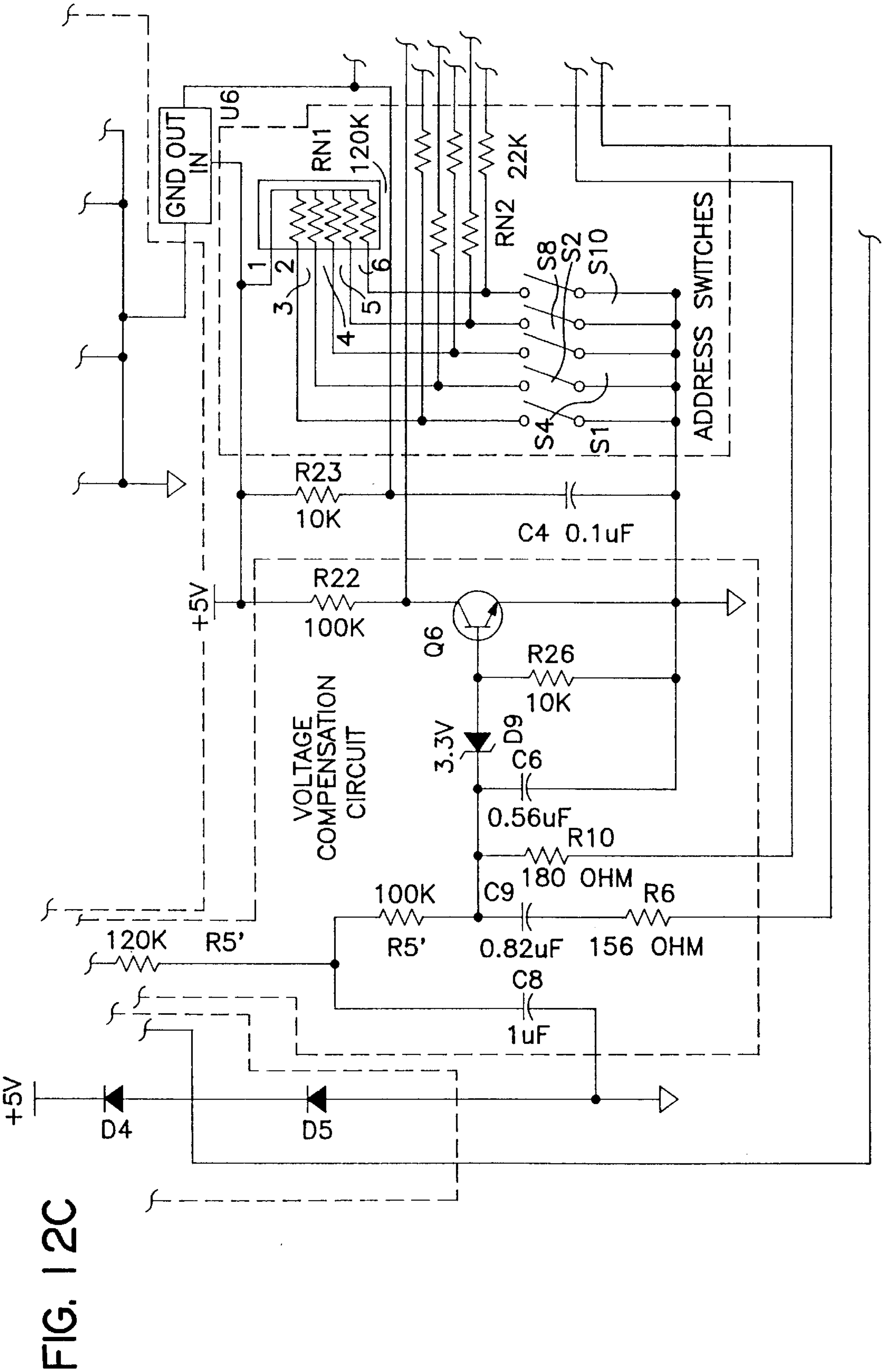
Figure 12D:
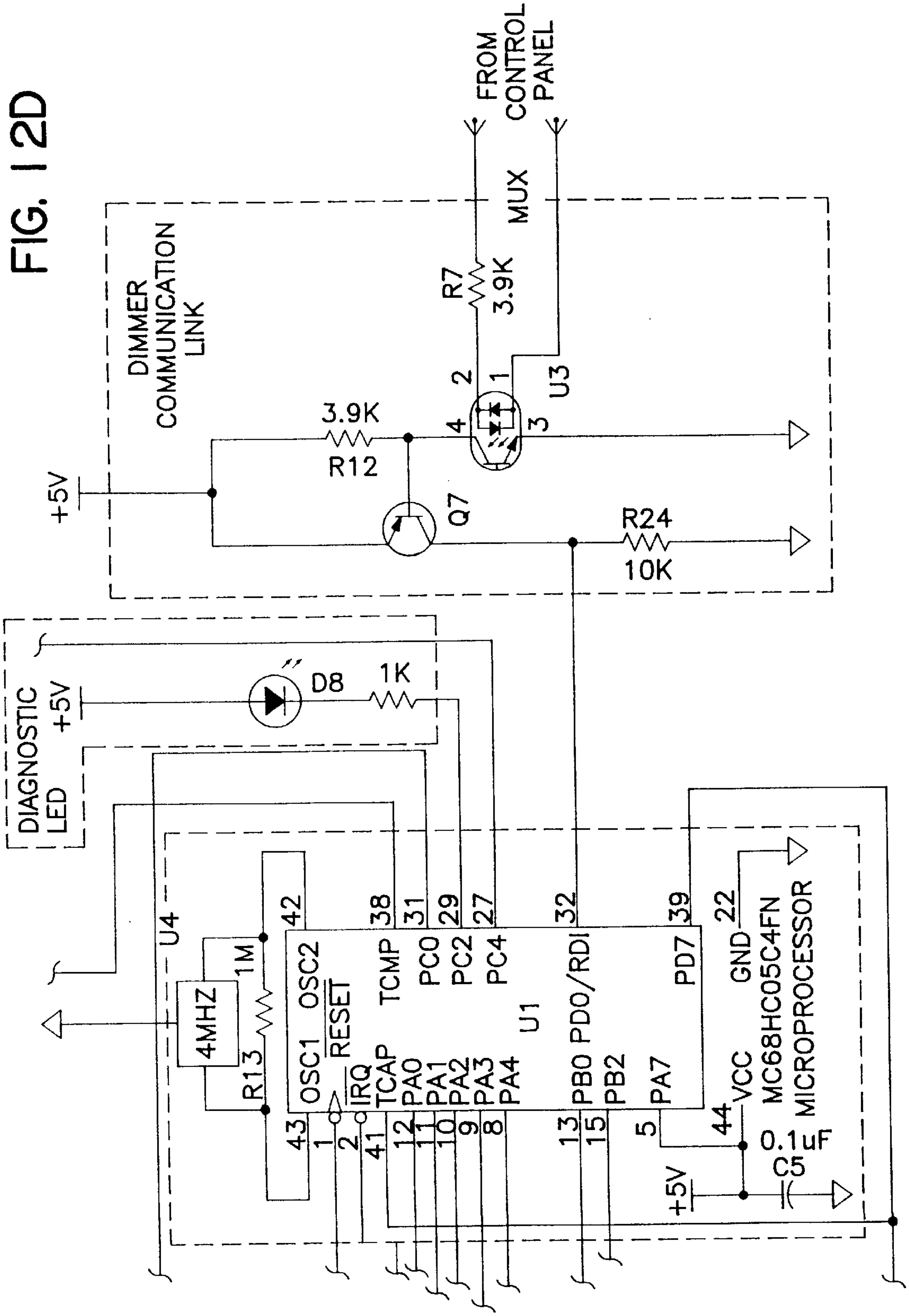

Referring to FIG. 11, the flow chart illustrates the various preferred steps carried out by the microprocessor MP in diagnosing the status of its associated dimmer module. First, it is determined whether the dimmer module has power applied to it. This is achieved by monitoring the line source voltage applied to the dimmer. If no power is applied to the dimmer, the LED will be off. If power is applied, the microprocessor determines whether the dimmer module's triac is either shorted or open circuited. This is done by the circuitry described below with reference to FIG. 12. If the triac has failed, the microprocessor causes the status indicator (an LED) to flash several times per second. If the triac is operating properly, the microprocessor determines whether the dimmer is receiving serial data from a control unit over the multiplex link. If no data is received, the LED is blinked on and off slowly, e.g., on for two seconds, and off for four seconds. If data is received, the microprocessor determines whether the dimmer relay is open. If not, thus indicating that the dimmer is operating but the control is telling dimmer to be off, the LED is blinked on for, say ¼ second, and off for ¾ second. If the dimmer relay is closed, the LED is blinked on for, say ¾ second, and off for ¼ second. This process is continuously repeated to provide a constant update on the dimmer/system status.

In FIG. 12, a preferred circuit for the dimmer described above is shown in detail. The various circuit elements of each of the functional blocks shown in FIG. 5 are shown in dashed lines of each block. The AC power circuit includes the circuit breaker S1, relay S2, triac Q5 and RFI choke L1. As mentioned earlier, the circuit breaker provides overcurrent protection and the ability to disconnect AC power to the dimming module. The relay S2 is used to disconnect power to the load being controlled by the dimming module and is controlled by the microprocessor U1. The conduction of triac Q5 is also controlled by the microprocessor in such a manner as to limit conduction to a portion of each AC line cycle; such portion is determined by the zone intensity information provided by one of the wallmounted controls on the multiplex link. Pin 38 of U1 turns on the optically-coupled triac U2 through R14. The current through R16, U2, R17, D7 and D6 triggers the gate of Q5 and forces it to conduct. Once Q5 is conducting, U2 remains on by the current path formed by R18 and R19. This is done to drive high impedance loads with current levels below the holding current of Q5. Capacitor C7 is connected across the gate to cathode of Q5 to improve its resistance to false triggering due to noise. The rate of rise of the load current is limited by the choke L1 to reduce the audible noise (buzzing) in the lamp caused by the abrupt change in current when the Q5 is turned on. The choke also serves, as indicated above, to limit the amount of RFI noise generated by the switching action of Q5. The microprocessor U1 and the relay S1 require DC supply voltages much lower in amplitude than the AC line amplitude. To provide this voltage, the AC line is rectified through the diode bridge DB1 and dropped across a high voltage field-effect transistor FET Q4. Q4 is allowed to turn on whenever Q3 is off. Q3 will be off when the rectified line voltage is less than the sum of the voltages across the zener diode D2 and the drop across the resistor R1 and R1'. The voltage generated across R1 and R1' needed to turn on Q3 is determined by the value of R15. Resistors R1, R1' and R15 form a voltage divider network to bias the base of Q3. The values are selected to limit the peak voltage on Q4 to within its safe operating area. Resistors R2 and R2' provide a means to turn on Q4 when Q3 is off. Resistor R3 serves to slow the charging of the gate capacitor to minimize the RFI noise generated on the AC line when Q4 switches. D11 limits the peak voltage on the gate of Q4. With the values selected, capacitor C1 is allowed to charge to a maximum value of 32 VDC. If Q4 is on long enough to try to charge C1 higher, D1 will be biased on, thereby forcing Q3 on and Q4 off.

Once C1 is charged to its maximum value the voltage is used to drive the relay and the microprocessor. The current needed to drive the relay is greater than that required by the microprocessor and the control circuit.

To reduce the peak current draw through Q4 and minimize power dissipation when the relay is energized, the current through the relay coil is used to generate the 5 VDC supply needed for the microprocessor. When the relay is off, the 32 VDC supply is dropped across Q1. The zener D13 allows C2 to charge to 5V. Q1 is biased on through R29, and the base voltage is clamped by diodes D15 and D18. When the relay coil is energized, Q8 is turned on by U1, R11, Q2 and R4. The current through the relay coil charges C2 to a value limited by diodes D14 and D13. While D14 is conducting, Q1 is forced off. Hence, C2 can only be charged by the current through the relay coil when the relay is energized.

To control the timing of the gate of Q5, i.e., the triac's firing angle, the AC line zero cross must be known by the microprocessor. This information is provided by the zero-cross detector comprising resistor R6, R6' and the protection diodes D4 and D5. Since the microprocessor is referenced inside the bridge DB1, alternate half cycles of the line voltage force the voltage on pins 41 and 39 of the microprocessor between 5V and common. The edges of the transitions define the AC line zero crossing. The microprocessor also requires dimming control information to compute the delay from the zero crossing to turn on the triac during each half cycle. As noted above, this information is received by the dimmer through the serial data link MUX'. A voltage is applied across R7 and pins 1 and 2 of U3 to produce an output through R12, Q7 and R24 into pin 32 of U1. An optically-coupled device is used to provide isolation between the dimmer circuitry referenced to Class I voltage and the Class II circuitry which sends control information to each dimmer.

The input data received received on the data link is in the form of a string of bits which, in addition to indicating a desired zone intensity, also indicates the load type e.g., incandescent, fluorescent, etc., and maximum and minimum light settings (high and low end trim settings, respectively). The microprocessor uses this information to compute a delay time to turn on the gate of Q5 in each AC half cycle after each AC zero crossing.

Since many dimmer modules may exist on a single serial data link, each dimmer module must have a unique address. The address switches S1, S2, S4, S8, and S16 along with RN1 and RN2 provide inputs to the microprocessor defining a unique combination of up to 32 different addresses.

Light-emitting diode D8 and resistor R20 provide a diagnostic status indicator. The microprocessor causes the LED to "blink" in such a manner as to indicate normal operation or failure modes. One such failure mode is triac Q5 being either open or short circuited. R25, R25', D16 and D17 provide an input into to the microprocessor which signifies a fault condition by the presence or absence of voltage at certain points in each half cycle. Another defined failure is the absence of data being received on the serial data link.

The microprocessor also receives an input from the voltage compensation network which it uses to correct the firing angle of the triac during to compensate for variations in the AC line voltage. This correction forces the output voltage of the dimmer to remain relatively constant during these variations. The rectified AC line voltage is taken from the full-wave bridge DB1 through D12. Resistors R5, R5', and capacitor C8 form an integrator to "smooth" the 60 Hz ripple of the rectified line voltage. This filtered voltage varies proportionally with the amplitude of the AC line and is used to charge capacitors C9 and C6 through resistor R9. C9 may be switched in and out through R8 and pin 15 of the microprocessor to change the time constant to accommodate different ranges of AC line voltages. C6 is used for 80–160 VAC and C6 plus C9 is used for 160–277 VAC. The capacitors are discharged by R10 and pin 13 of the microprocessor. The microprocessor allows the capacitors to start charging at the AC zero crossing. When the capacitor's voltage reach a threshold level determined by D9, and R26, transistor Q6 turns on and pulls pin 2 of the microprocessor low through R22. The microprocessor measures the charging time of the capacitors and uses it to determine the amount of correction needed. The microprocessor contains the ROM required to store the program that receives the various inputs and determines the turn-on point of triac Q5 in each AC line cycle. U4 and R13 form an oscillator needed to run the microprocessor.

The invention has been described with particular reference to preferred embodiments. It will be appreciated the certain variations and modifications can be made without departing from the spirit of the invention. Such variations and modifications are intended fall within the protected scope of the invention, as defined by the appended claims.

What is claimed is:

1. In a light dimmer adapted to control the current flow through a lighting load to selectively adjust the luminous output thereof, said light dimmer comprising a dimming circuit connected between a power source and said lighting load, said dimming circuit being responsive to a dimming level control signal applied to an input terminal thereof for selectively varying the RMS voltage across the lighting load, the improvement comprising:

(a) means for sensing an absence of said dimming level control signal on said input terminal;

(b) circuit breaker means for selectively switching power OFF and ON between said power source and said dimming circuit; and (c) logic and control means operatively coupled to said sensing means and said circuit breaker means for applying a predetermined dimming level control signal to said control circuit in response to both an absence of said dimming level control signal on said input terminal and a cycling of said circuit breaker means OFF and then ON.

2. Voltage compensation apparatus adapted for use in a light dimming circuit for maintaining a substantially constant lighting load current notwithstanding short-lived changes in a nominal line voltage, said apparatus comprising:

(a) first means operatively connected to an A.C. voltage source for determining a first time interval representing the average time required for the A.C. waveform of said voltage source to reach a predetermined threshold level during each half cycle of a nominal operating period;

(b) second means operatively connected to the A.C. power source for determining during each half cycle of the waveform a second time interval representing the time required for the A.C. waveform to reach such predetermined threshold level;

(c) means for comparing the first and second time intervals during each cycle of the waveform and for producing an error signal representing the difference in such time intervals; and (d) means responsive to said error signal for adjusting the RMS voltage across the lighting load at a substantially constant level notwithstanding short-lived variations in the amplitude of the A.C. waveform of the voltage source.

3. The apparatus as defined by claim 2 wherein said first and second determining means comprise a capacitive element and means for measuring the charging time of said capacitive element.

4. The apparatus as defined by claim 3 wherein said capacitive element has different values dependent upon the value of said nominal line voltage.

5. The apparatus as defined by claim 2 wherein said first and second determining means comprise a microprocessor.

* * * * *